US010895668B2

(12) United States Patent
Shaban et al.

(10) Patent No.: US 10,895,668 B2
(45) Date of Patent: Jan. 19, 2021

(54) METHOD AND APPARATUS OF INSTRUMENTING CONVERGING AND DIVERGING FLAT LENSES BY SEQUENTIAL UPRIGHT AND INVERTED 3-D TRANSPARENT ANVILS: PYRAMIDAL FLAT LENS

(71) Applicants: Yasser Ragab Shaban, Sofia (BG); Milen Panteleev, Varna (BG)

(72) Inventors: Yasser Ragab Shaban, Sofia (BG); Milen Panteleev, Varna (BG)

(*) Notice: Subject to any disclaimer, the term of this patent is extended or adjusted under 35 U.S.C. 154(b) by 47 days.

(21) Appl. No.: 16/296,255

(22) Filed: Mar. 8, 2019

(65) Prior Publication Data
US 2019/0235137 A1 Aug. 1, 2019

(51) Int. Cl.
G02B 3/00 (2006.01)
G02B 5/04 (2006.01)
G02B 3/08 (2006.01)

(52) U.S. Cl.
CPC ......... *G02B 3/0043* (2013.01); *G02B 3/0056* (2013.01); *G02B 3/08* (2013.01); *G02B 5/045* (2013.01)

(58) Field of Classification Search
CPC .............................. G02B 3/0056; G02B 3/0068
See application file for complete search history.

(56) References Cited

U.S. PATENT DOCUMENTS

| 4,929,065 | A | * | 5/1990 | Hagerty ................ C03B 23/203 359/653 |
| 5,541,774 | A | * | 7/1996 | Blankenbecler ..... G02B 3/0037 359/653 |
| 5,703,722 | A | * | 12/1997 | Blankenbecler ..... G02B 3/0037 359/653 |
| 6,104,446 | A | * | 8/2000 | Blankenbecler et al. ................... C03B 23/203 359/653 |

FOREIGN PATENT DOCUMENTS

KR 20120078509 A * 7/2012

* cited by examiner

Primary Examiner — Charlie Y Peng

(57) ABSTRACT

The present invention titled: "Method and apparatus of instrumenting converging and diverging flat lenses by sequential upright and inverted 3-D transparent anvils: pyramidal flat lens" is a transparent flat rectangular or circular with nozzle shaped without the addition of the outer 3-D anvil. The apparatus has a fixed height assembled from sequential 3-D anvils with one anvil adjacent to a reversed one. The 3-D anvils are arranged from the boundary to the center zone with gradual reduced volumes. The volumes of the 3-D anvils result from establishing inclined conjugate planes to the pyramidal planes. The converging and diverging pyramidal flat lenses have the same structure, but with the reverse order of the index of refractions of the filling transparent materials.

9 Claims, 40 Drawing Sheets

METHOD AND APPARATUS OF INSTRUMENTING CONVERGING AND DIVERGING FLAT LENSES BY SEQUENTIAL UPRIGHT AND INVERTED 3-D TRANSPARENT ANVILS: PYRAMIDAL FLAT LENS

CROSS-REFERENCE TO RELATED APPLICATIONS

Not applicable

STATEMENT REGARDING FEDERALLY SPONSORED RESEARCH OR DEVELOPMENT

Individual Efforts

BACKGROUND

The assembly of the present invention: Method and apparatus of instrumenting converging and diverging flat lenses by sequential upright and inverted 3-D transparent anvils: pyramidal flat lens, resembles the structure of Egyptian great pyramids. The pyramidal flat lens for rectangular and square base is the lower cross section of the pyramid with upper side facing the head of pyramid with a smaller cross section than the base. The pyramidal flat lens for circular base is just the fitting geometry for square pyramidal flat lens. The trigonometric diagrams presented in this patent are to be the first description of a flat lens. Even though the topic of flat lenses has been around for decades however the published methods of assembling flat lenses lack of clear descriptions and mathematics. Flat lenses has wide applications, mentioning few; corrected screen for electronic devices (e.g. smart phones) for farsightedness and nearsightedness cases, Eye glasses for Farsightedness (hyperopia) and Nearsightedness (myopia), concentrating solar power for photovoltaic, security and personal camera, microscope, telescopes, magnifiers, and for telescopic windows for luxury houses, apartments, and restaurants.

BRIEF DESCRIPTION OF DRAWINGS

Figures included in this invention are briefly described as follows. These figures are 3-D viewed from side elevation for an object turned counterclockwise with an angle, with few exceptions. The pyramidal cord refers to any line connecting the head of pyramid to any point at the central axes of the fundamental plane.

SUMMARY OF THE INVENTION

Method and apparatus of instrumenting converging and diverging flat lenses by sequential upright and inverted 3-D transparent anvils, pyramidal flat lens, in short; is assembled by a sequential 3-D anvils in the reverse orientation, arranged from the boundary to the center zone with constant height (thickness). The volumes of the 3-D anvils result from establishing inclined conjugate planes to the pyramidal planes. The arrangement of the pyramidal planes begins from the boundary of the lens; pyramid with finite height, hence the cords of the pyramidal plane meet at the summit point S of the pyramid. The vertical inclinations of the pyramidal cords becomes smaller as we approach the center and the distance of separation between two adjacent pyramidal planes is getting smaller and smallest as we approach the central height of the pyramid p. The structure of the converging is the same as the structure of the diverging pyramidal flat lens. The illustration of the pyramidal flat lens is for rectangular base, however the same methodology is applied for square and circular base flat lenses. The rectangular base flat lens is more complicated than the square and circular flat lenses.

Figure 1:
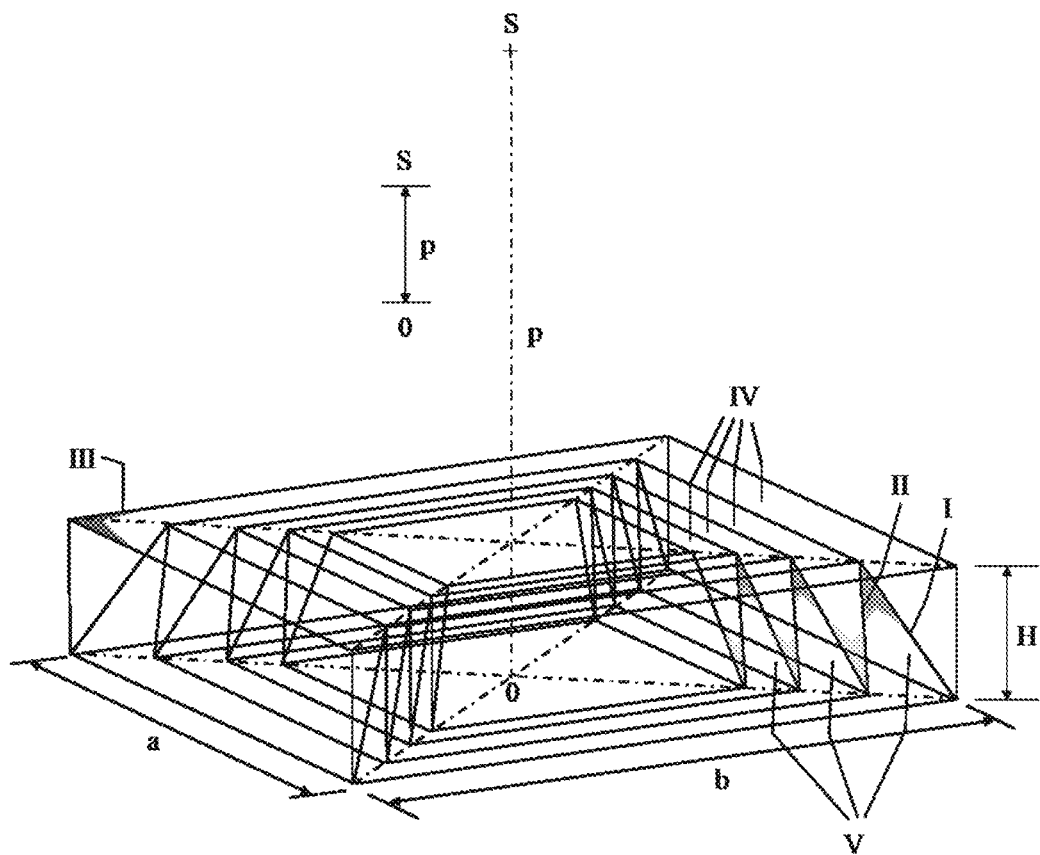
FIG. 1 An overall description of the pyramidal flat lens with pyramidal planes starting from boundary of the lens. The components and subcomponents are indicated by their numbers in the consequent figures.

An overall description of the pyramidal flat lens is shown in FIG. 1. The vertical height (thickness) of the pyramidal planes is constant and equal to H. Each pyramidal plane (four sides) comprising 360 refracting objects (shaped rectangular) aligned with corresponding 180 central axes in 2 π radian (360°) from the central point at the base of the pyramid (rectangular) and aligned with the pyramidal cords to the summit point of the pyramid S. (The base axis refers to any line connecting two points in the rectangle base of the pyramid via the zero-point.) These refracting objects are made of transparent medium and they are distinguished from the spaces between two adjacent degrees. Light refracts from the distinguished objects as well as from the spaces. The primary operation of the pyramidal flat lens is based on a refraction of light ray at and below the critical optical composition with maximum refraction π/2 before merging to the ambient. Because the vertical inclination of the pyramidal planes varies from the boundary to the centerline, a variable refractive index of transparent medium is introduced to the flat lens in order to maintain a constant refraction angle at π/2 for the ideal pyramidal flat lens. However, a simplified pyramidal flat lens is introduced to reduce the number of variables of optical materials. The structure of the ideal and simplified flat lenses but they vary in the fillings.

The inclined conjugate planes (II) are not responsible for light refraction but they will establish a unique volume when connected properly to the pyramidal planes. The conjugate (II) planes (four sides) are slightly tilted inward (>90°). The only uninclined plane in the flat lens is the exterior volume (III) which is aimed vertically (=90°).

One embodiment pyramidal of the flat lens is the coherent assembly of the upright and inverted volumes shaped as 3-D anvils.

A second embodiment of the pyramidal flat lens is the structure of the diverging and converging lenses is the same but the optical filling is in reverse.

A third embodiment of the pyramidal flat lens is the methodology of instrumenting a square based and circular based flat lens remain the same.

A fourth embodiment of the pyramidal flat lens is the dependency of the focal length on the dimension of the pyramid (base and height).

A fifth embodiment of the pyramidal flat lens is the simplified lens from the ideal flat lens.

DETAILED DESCRIPTION OF THE INVENTION

I) The Structure of the Invention

I-1 the Pyramidal Planes and their Associated Elements

Even though the structure of the pyramidal flat lens is shown for rectangular base, but it is a straight forward for square base. The methodology applied here is also valid for circular base flat lens, more precisely considered a frustum of right circular cone immersed in a grooved cylinder with fixed vertical height.

The Pyramidal flat lens is a bulk volume with constant height with top and bottom flat surfaces with unequal areas. The top surface (nearer to the summit point) has a smaller cross section than the bottom surface, farther side from the summit point. Looking inside the structure of this closed volume, we see that it is composed of several horizontal planes (top and bottom) and several inclined vertical planes. The horizontal planes (top and bottom) are concentric with center zero point, the inclined vertical planes are also concentric with respect to central head axis of the pyramid. The distance of separation between two adjacent horizontal planes is not constant; similarly, the distance of separation between two adjacent inclined vertical planes is not constant. The inclined planes are 3-D surface. Two types of inclined vertical planes are in the inside structure, the first is called the pyramidal planes and the second is called the conjugate planes. While the pyramidal planes are confining the cords, the conjugate planes are to close the space between two adjacent pyramidal planes. Light ray refraction is only caused by the elements of the pyramidal planes. When the bulk volume is immersed into a grooved structure, e.g. rectangular or cylinder, that has vertical sides, the resultant volume becomes rigid with equal top and bottom surfaces.

The main element of the pyramidal flat lens is the cord which is a line connecting the pyramid summit point S to any point located at the axes of the horizontal base. Because the horizontal planes are divided into 360 half axes (180 axes from end to end via the zero point), the total number of cords per each pyramidal plane is 360 cords with equivalent number of spaces. These cords are confined in a 3-D plane with constant vertical height.

Figure 2:
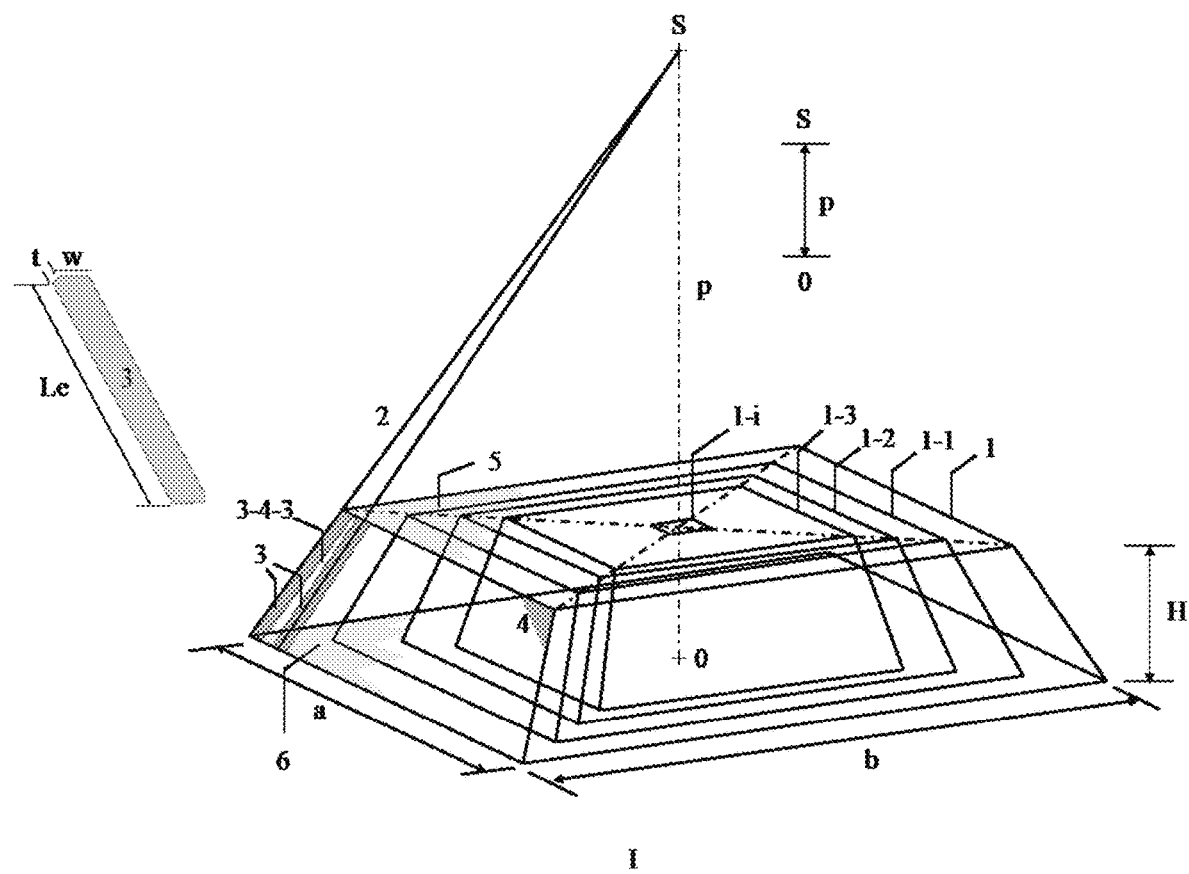
FIG. 2 The main and inferior pyramidal planes with equal height H (thickness) with two pyramidal cords. The portion of the line that lies at the pyramidal plane is only needed for refracting the light ray.

As shown in FIG. 2, the pyramidal plane (I) begins from the border to the center. The pyramidal planes are indicated with numbers (starting from the boundary) 1, 1-1, 1-2 . . . 1-i (the end plane). The cord of the pyramid (2) is the extended line from the base of the pyramid of sides a-and-b to the summit point S. The axis of the refracting object (3) is just the pyramidal cord (2). The dimension of the refracting object (3) is shown at the outside domain of the diagram. Any line at any location inside the pyramid connected to the summit point S is being considered element 2. The extension of the pyramidal cord above the height H is virtual and not real in the flat lens. The vertical height of the pyramidal planes is constant and equal to H and, it is lesser than the vertical height of the pyramid p measured from the zero point at the base to the summit point S. If these pyramidal cords (2) are made with rectangular shape of thickness (t) and width (w), then, the chopped portion to vertical height H manifests element 3. Otherwise, if the width (w) of the element 3 is greater than the width of the pyramidal cord of same shape, then the central line of element 3 must be aligned with element 2. Because of various inclinations of all pyramidal planes and because of the various inclinations of all cords per one pyramidal plane hence the length "Le" of element 3 is variable. The single side of pyramidal plane (4) is the area of the pyramidal plane, the area between two adjacent refracting objects is labelled (3-4-3). Element 3 is distinguished from element 3-4-3 by its thickness t. The covering areas of the upper and lower surfaces are denoted (5) and (6) respectively and they are transparent medium.

Figure 3:
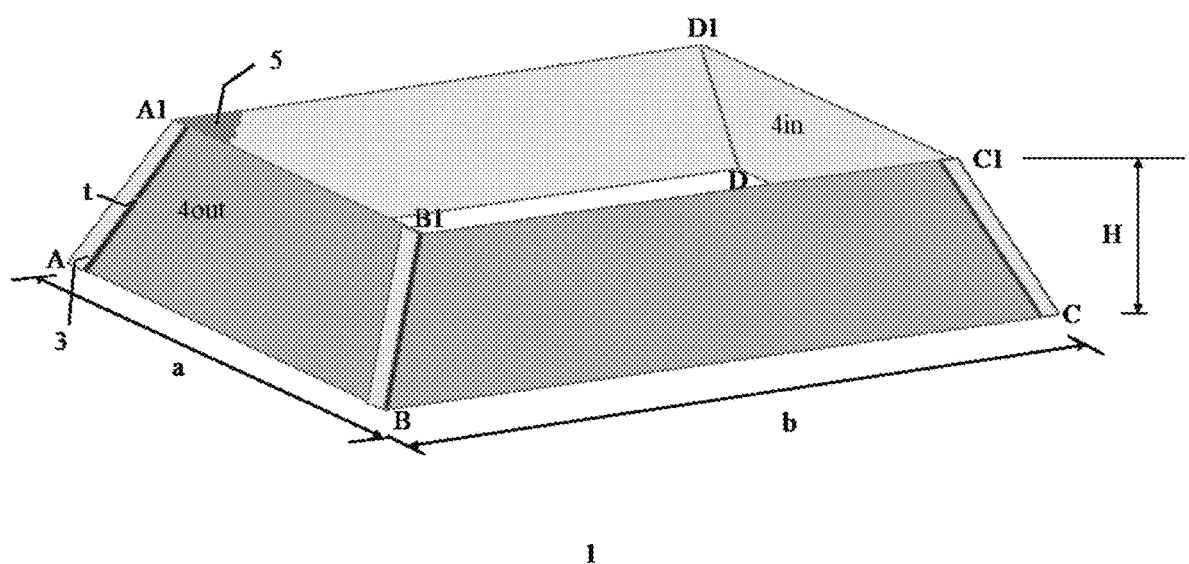
FIG. 3 The outermost pyramidal plane (main) with sides a and b. All pyramidal planes comprise 360 objects per plane with their central lines ends at the summit of the pyramid.
Figure 4:
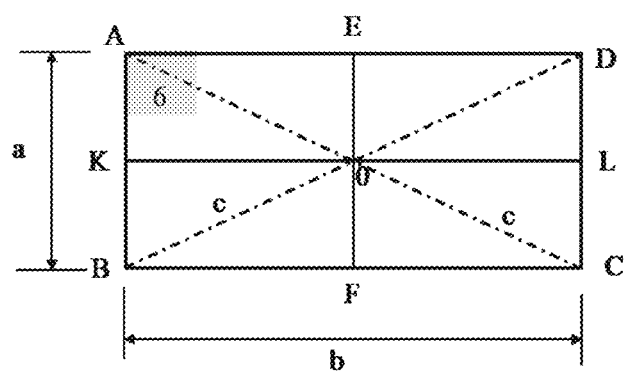
FIG. 4 The fundamental rectangle of the pyramid of side a and b.

The outermost pyramidal plane (1) is shown in FIG. 3 with sides a-and-b owns the greatest vertical inclination. The inner surface is denoted by the element 4in and the outer surface is denoted by the element 4out. If no distinguished is made between the inner and outer surfaces of the pyramidal plane, then element 4 is referred to the pyramidal plane from both sides. As shown in the diagram element 3 is distinguished from element 4 by its thickness t. The corners of the lower base are indicated by letters A, B, C and D, while the corners of the upper portion are indicated by the letters A1, B1, C1 and D1. In other case, we shall see the letters of the upper corners are indicated with different labels which referring for other height. The base of the outermost pyramidal plane (base of pyramid) is shown in plan-view, FIG. 4, for rectangle base. The letters shown in this diagram at the corners and sides as well as the diagonal c hereafter are referred to points and locations of the main pyramidal cords (2) and their inclinations.

Figure 5:
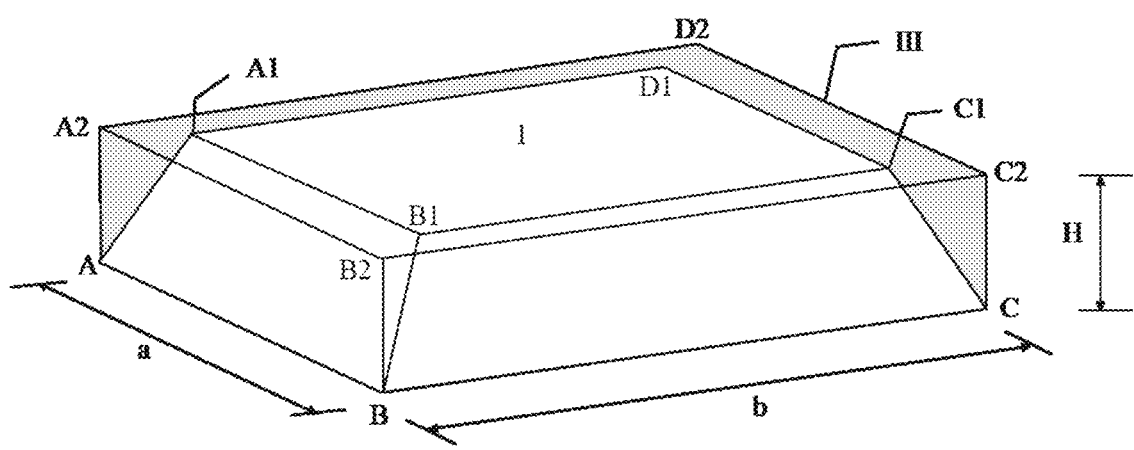
FIG. 5 The outermost pyramidal plane inside a grooved 3-D rectangular structure. The filling volume between the outer pyramidal plane and the grooved rectangular will shape a rigid 3-D rectangular.

The outermost pyramidal (1) plane is immersed into a grooved 3-D rectangular (III), FIG. 5. This is the outer conjugate plane for the main pyramidal plane. This is the only vertical plane without any inclination present in the flat lens. Element III is therefore the remaining volume for the pyramidal flat lens to have rectangular shape.

Figure 6:
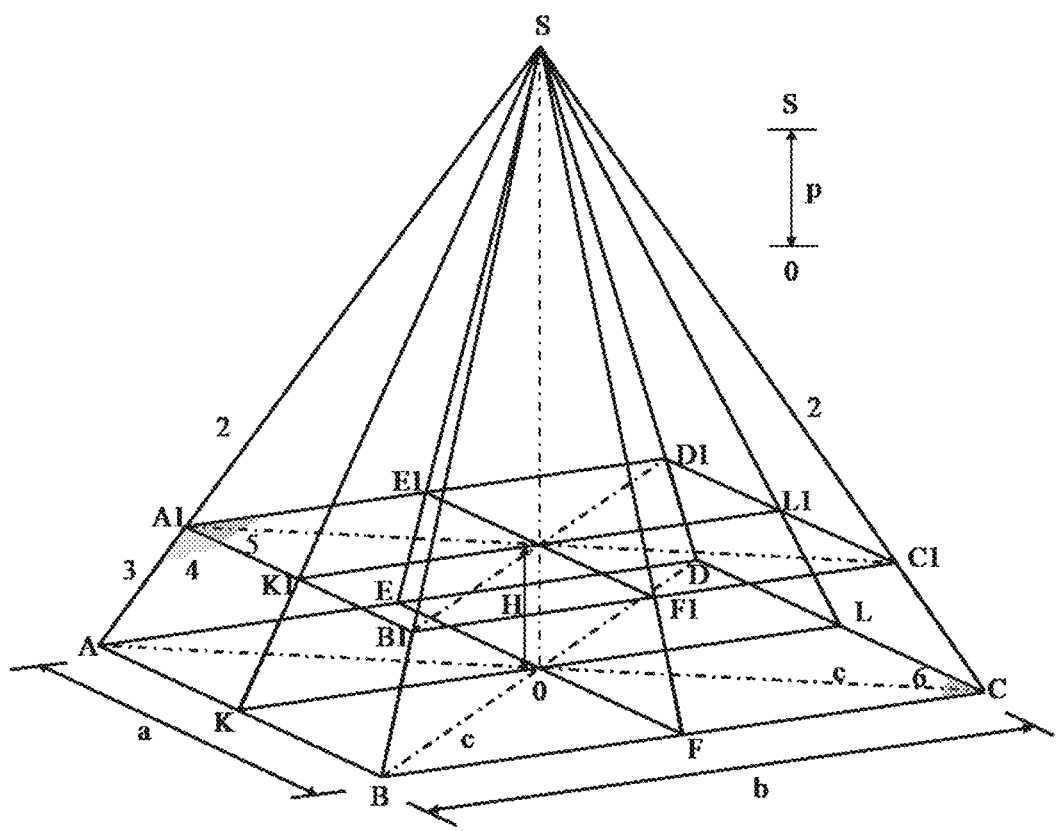
FIG. 6 The main pyramidal sector of the pyramid of height p.
Figure 7:
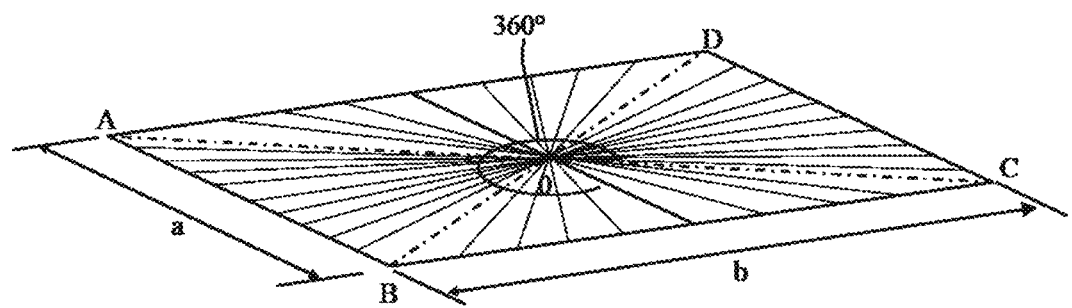
FIG. 7 The axial divisions of the base-rectangle of pyramid of sides a and b to 360 degrees.
Figure 8:
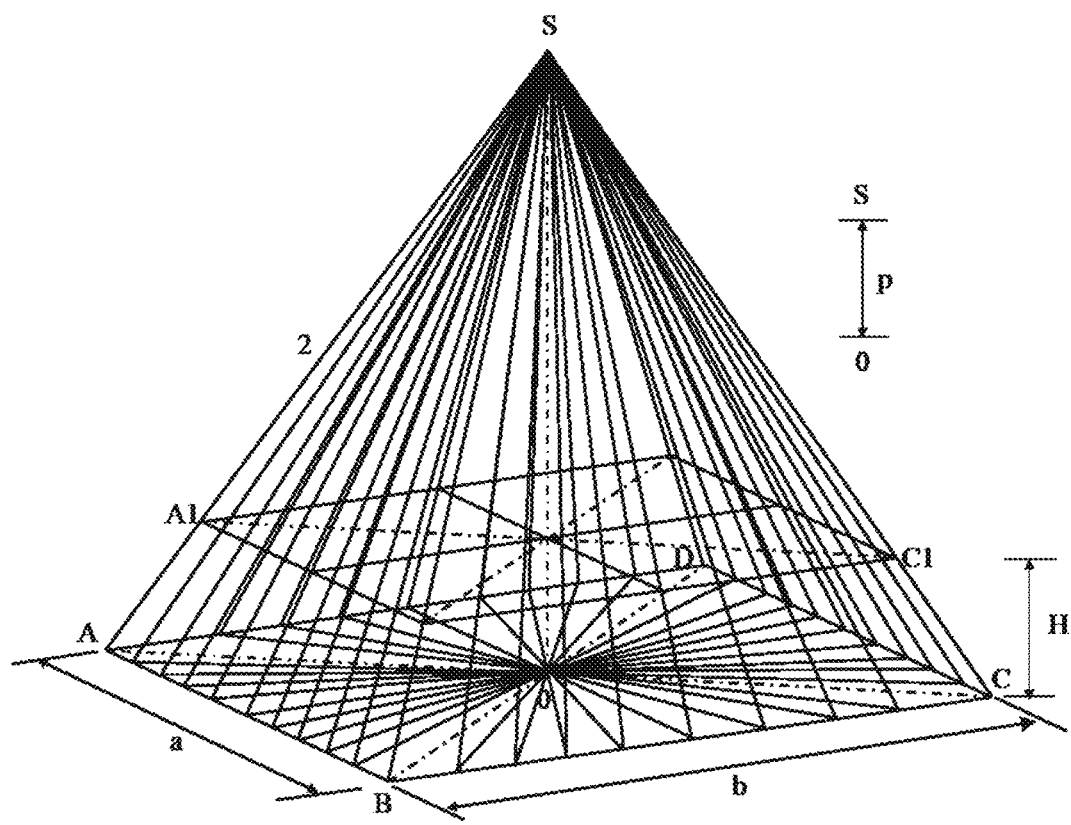
FIG. 8 The connections of the pyramidal cords to the base rectangle axes at the outer plane. Each axis of the base and the corresponding line cord of the pyramid lie in one plane.

The outermost pyramidal plane (1) is defined from given lens's height (thickness) H, base dimension and pyramid of height p, FIG. 6. Initially, the base must be divided from the center point into 180 axes (360 central half axes; in 2 π radians) as shown in FIG. 7. Consider we rotate the diagonal c (corners A and C) 180 degrees at an increment of one degree so that a central axis via the zero-point is extended to meet the rectangle base at two points. As we note, each base-axis is connected to two pyramidal cords in the opposite sides (180°) extended to the summit point S. The diagonals "c" of the pyramid runs from one corner to the opposite corner and they are equal. The number of central base axes shown in this diagram is four and the number of pyramidal cords is eight: four cords at the corners and four cords at the half-side of the rectangle base; at ½ a and ½ b. FIG. 8 shows the pyramidal cords (2) joined with the central base axes. For each pyramidal plane, there are 360 cords (2) which are the axes of the refracting objects (3), these cords are connected by 180 central base axes from opposite points. The number of base axes and their orientation remain the same for all pyramidal planes. What is real here is only the portion of the cord that lies within the first pyramidal plane A, B, C, D and A1, B1, C1, D1, the upper and lower closed surfaces. The remaining parts of the cords and the base axes are for the design purpose only.

The distance of separation between two degrees is smallest far the closest point to the center. The smaller is the distance of separation the more accuracy we can achieve for flat lens as far as the dimension of the focal point is concerned. Thus, for larger base area, we can further divide each degree to 60 minutes of arc and for giant flat lens; we add further central axes by dividing each minute of arc into 60 seconds of arc.

The pyramidal cords (2) are made with rectangular shape of thickness (t), width (w) and length (Le). Because the distance of separation between two degrees gets smaller and smallest as we approach the central height p of the pyramid, the width w of the refracting object can be reduced. The refracting object is aligned from its central axis to lie on the pyramidal cord such that the axis of refracting object, the pyramidal cord and the base axis lie in one plane (triangle).

Figure 9:
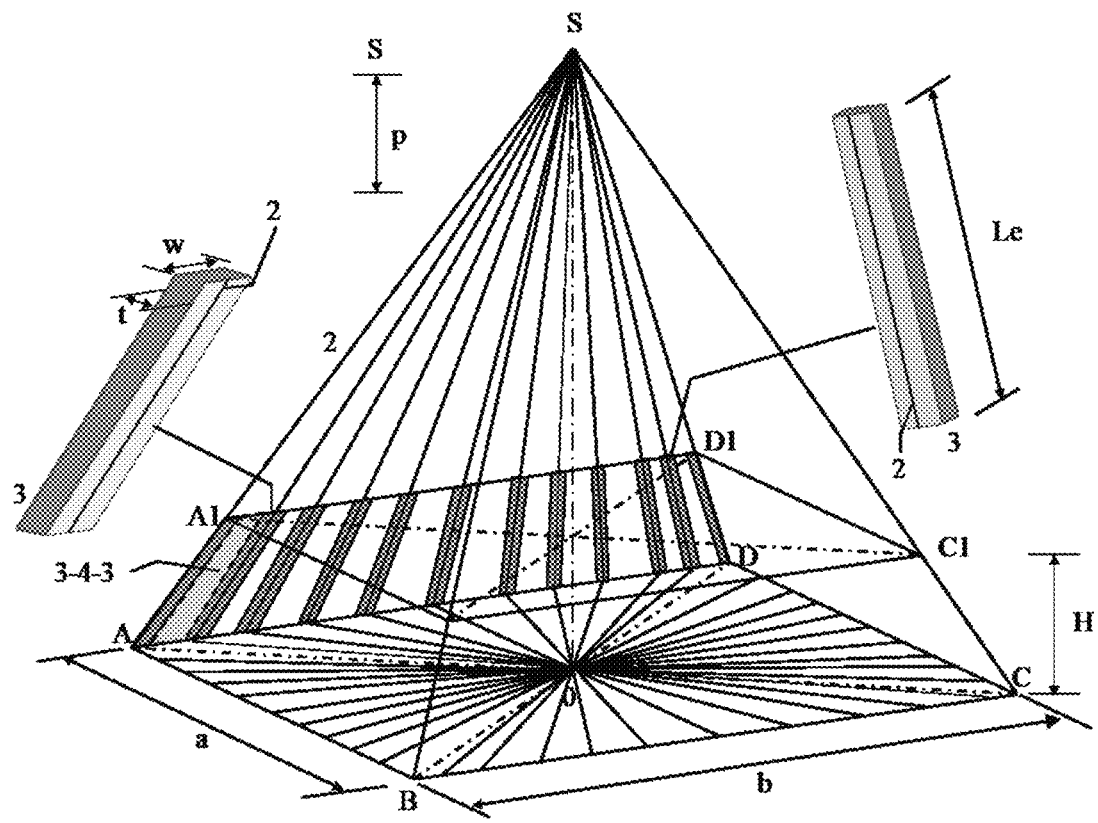
FIG. 9 The 3-D rectangular refracting objects are shown at the longer side of the outermost pyramidal plane.

FIG. 9 illustrates the 3-D rectangular refracting objects (3) in the side b of the outermost pyramidal plane. The pyramidal cords, and consequently the refracting objects, that are located in one plane are termed here sub-pyramidal cords, with respect to eight main cords (four at the corners and four at the half sides). With respect to a line of sight viewer, the surface of refracting object per one side of a pyramidal plane is changing its direction according to the base axis. As shown in the expanded view, the faces of the refracting objects from both corners at the backside confine an angle equal to the angle made by the corresponding base axes.

Figure 10:
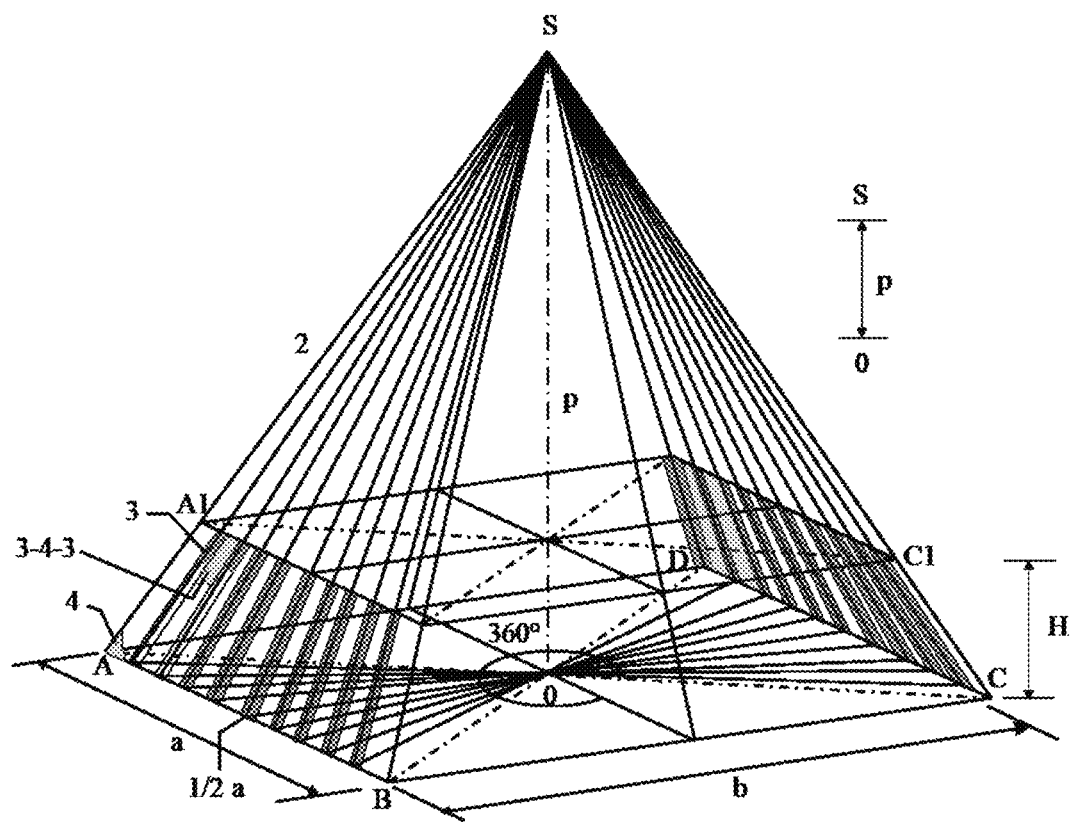
FIG. 10 The 3-D rectangular refracting objects are shown at the shorter side of the outermost pyramidal plane.

If we trace the alignment of the refracting objects per one side (90 objects or more), FIG. 10, we see that the axis of object (3) is gradually de-inclined counterclockwise from corner-A to the point (½ a) in which it is perpendicular to the central axis, then de-inclined counterclockwise until reaching corner-B. Light is refracting from object 3 as well as from the spacing area between two objects, denoted 3-4-3.

Figure 11:
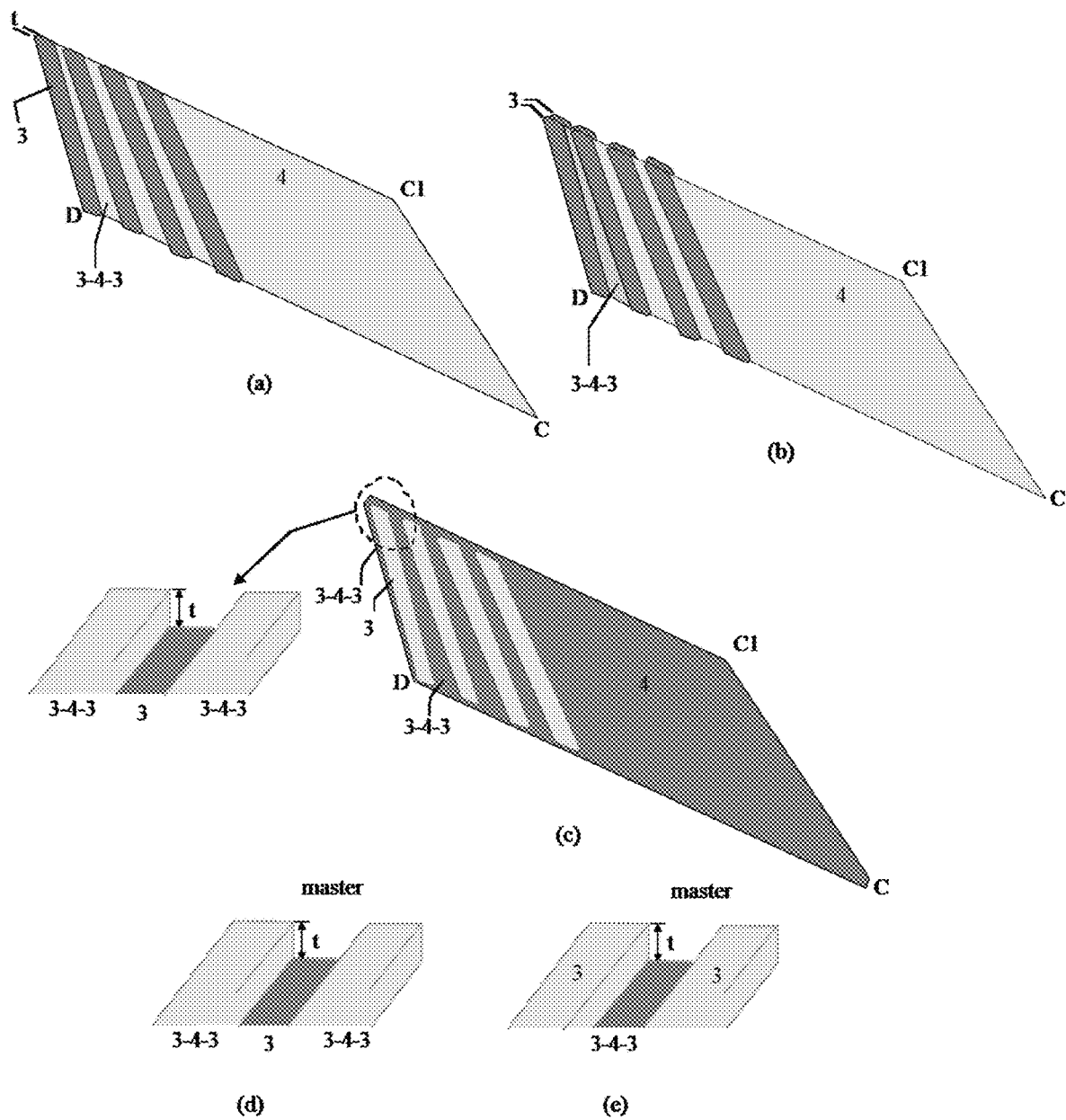
FIG. 11 Illustration of the 3-D rectangular refracting objects for three cases. (a) Single-sided distinct refracting objects with flat spacing; (b) double-sided distinct refracting objects with flat spacing and (c) grooved refracting objects with flat spacing. The volume printings of refracting objects are shown in d and e.

There are three different designs FIG. 11 (a, b and c) to implement the transparent refracting object (3) is implemented on/or in element 4 (transparent surface) of the pyramidal plane. Both elements 3 and 4 have the same transparency degree (same index of refraction). The first (a), element 3 is on the surface 4 (4in or 4out). Whatever is the thickness of element 4, element 3 is distinguished from element 4 by its thickness t. The second (b), element 3 is on the surface 4 (4in and 4out). Element 3 in this case is distinguished from element 4 in both sides by its thickness t. The third (c), element 3 is grooved inside element 4 with depth t. The geometry of elements 3 and 3-4-3 is not equal. The spacing between two adjacent elements (3) differs from one spot to another for a given side.

One practical approach to implement element 3 on element 4 for the above three designs is by volume printing (FIGS. 11-*d* and *e*). This can be done by a master plane, which has the pyramidal cords (2) in a surface equal to the surface of element 4. The master plane (not need to be transparent) is from an element with high melting temperature than element 4. The pyramidal cords in the master plane have equal dimension (thickness t and width w) of the refracting object 3 (transparent). (The length Le varies from one location to another per one side except at the pair corners of the side.) The first case in volume printing (FIG. 11-*d*) is to consider the pyramidal cords are grooved inside the master plane with depth t. Then by heating the master plane to a temperature corresponding or nearer to the melting temperature of element 4, and by exerting a force to a distance t on element 4 we achieve designs a and b.

The second case in volume printing (FIG. 11-*e*) is to consider the spaces between the pyramidal cords are grooved inside the master plane with depth t. Then by heating the master plane to a temperature corresponding or nearer to the melting temperature of element 4, and by exerting a force to a distance t on element 4 we achieve designs c.

I-2 the Inclined Conjugate Planes

Figure 12:
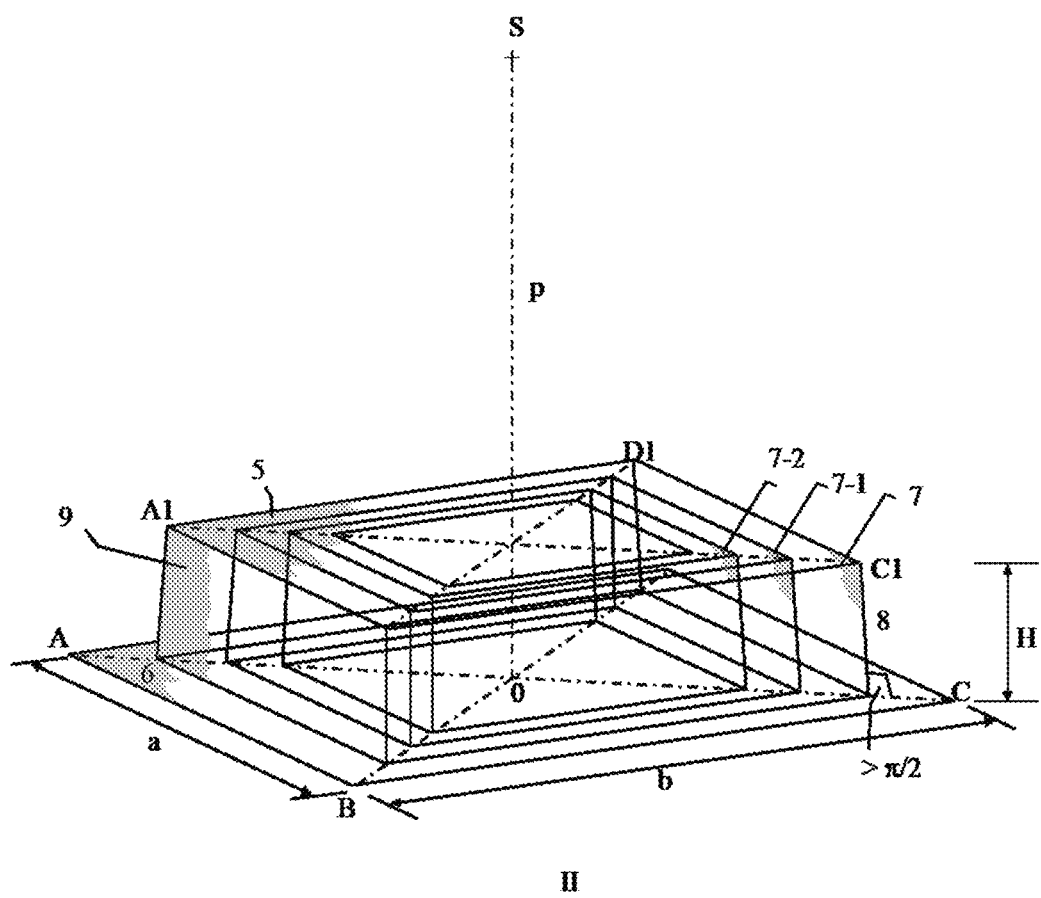
FIG. 12 The conjugate of the pyramidal planes. Their vertical sides are slightly inclined inward from all directions.

The pyramidal flat lens comprises the conjugate (II) of the pyramidal planes, FIG. 12. Three planes are indicated in the diagram with numbers 7, 7-1, and 7-2, starting from the boundary of the lens. The conjugate (II) planes are inclined slightly inward from vertical, thus they make angles slightly greater than $\pi/2$. The edge's height of these planes is denoted by element 8. Any surface or side in these planes is indicated by element 9. The conjugate plane (7) is the first inner plane in its order but it is the second plane in the flat lens after the pyramidal plane (1). These planes are not responsible for light refraction but their tasks are to divide the flat lens into upper and lower volumes for fillings regions IV and V with transparent medium of different refractive index. This will be explained in details in part II.

II) The Construction of the Invention

II-1) the Inclination Angles of Pyramid

Figure 13:
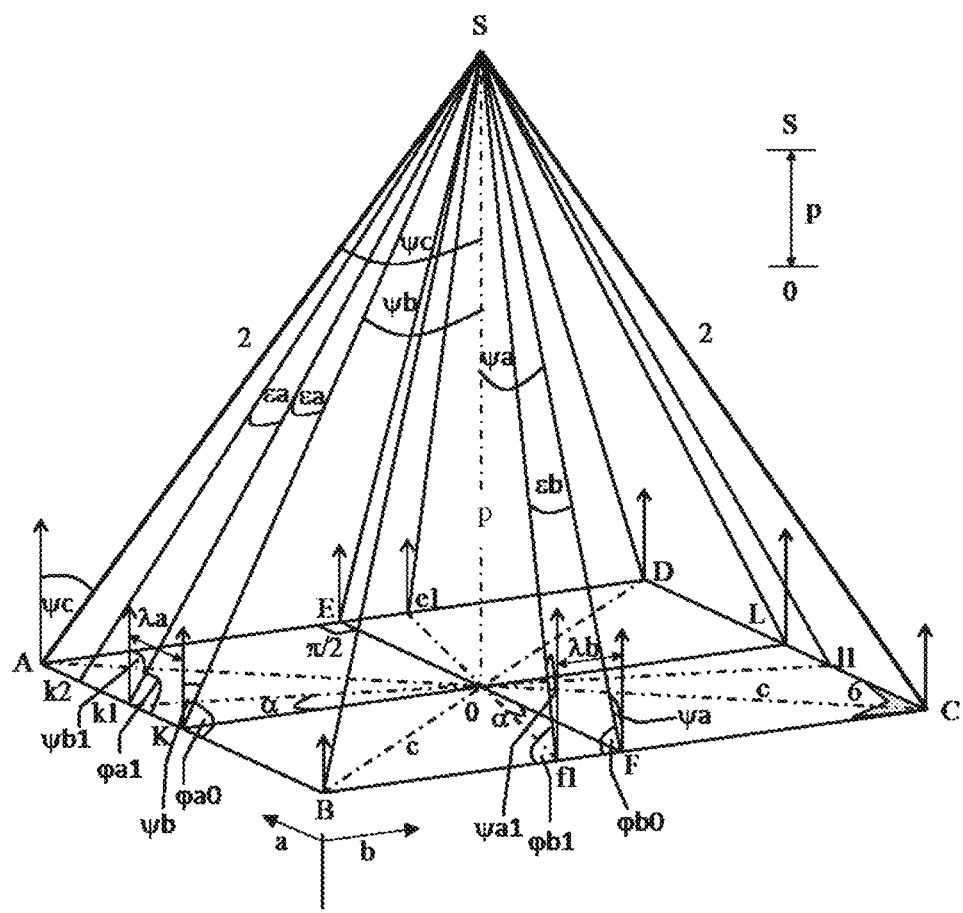
FIG. 13 The inclination of the main pyramidal cords at the diagonals and the axes of the base. The distance of separation between two pyramidal cords on the pyramidal plane, $\lambda$, is also indicated in the diagram.

The outermost pyramidal plane (1) is designed based on given information about the size of the flat length (a×b), the thickness of the flat lens H and the focal length which is directly related to the height of the pyramid p. The first pyramidal plane (1) comprising 8 main cords (this is true for all inferior pyramidal planes): four at the corners and four at the half sides of a and b. The inclination of the main cords of the pyramid of height p is equal in meaning to the inclination of the first pyramidal plane. The major inclinations of the pyramidal cords with height p and with rectangle base of sides a and b are shown in FIG. 13. The major inclinations are characterized by three angles: four equal angles at the corners, two equal angles at half side-a and two equal angles at the half side-b. For a square base, the major inclinations are two. For circular base, the inclination is only one. The major inclination at the corners A, B, C, D is denoted by $\psi c$, which can be found as a function of major axis c (diagonal) and the height of the pyramid p $$\psi c = \tan^{-1}\left(\frac{c/2}{p}\right) \quad \text{II-1}$$

The major inclination at the half width a (points K and L) is denoted by $\psi b$ $$\psi b = \tan^{-1}\left(\frac{b/2}{p}\right) \quad \text{II-2}$$

The third major inclination is at the half width b (points E and F) denoted by $\psi a$ $$\psi a = \tan^{-1}\left(\frac{a/2}{p}\right) \quad \text{II-3}$$

Since the rectangle base is divided into 360°, the angle between two adjacent axes is kept constant and denoted by $\alpha$ which is equal to 1 degree. Consider the axial side (K-L) is rotated clockwise to new points k1-l1. The distance between two adjacent base axes at the a-side can be found as a function of angle $\alpha$, $\lambda a$, between points K and k1:

$$\tan\alpha = \frac{\lambda a}{b/2} \quad \text{II-4}$$

Similarly, we can find $\lambda b$ between two adjacent base axes at the b-side:

$$\tan\alpha = \frac{\lambda b}{a/2} \quad \text{II-5}$$

It can be concluded from the above equations that the distance between two adjacent refracting objects (i.e. pyramidal cords) is greater at the shorter side-a, $\lambda a$, than at the longer side-b, $\lambda b$. In addition, the number of refracting objects at the longer side-b is greater than at the shorter side-a for equal angle $\alpha$. From equations II-4 and II-5:

$$\lambda a = \frac{b}{a}\lambda b \quad \text{II-6}$$

Since the increment length times the number of increments equal to the side length, then we have $$n\lambda a = a \quad \text{II-7}$$

$$m\lambda b = b \quad \text{II-8}$$

Where: n and m are equal to the number of increments in a-side and b-side, respectively. Substitute equation II-6 into equation II-7, $$n\frac{b}{a}\lambda b = a \quad \text{II-9}$$

By increasing the number of increments from n to (n b/a) in the a-side and by lowering the incremental distance from $\lambda a$ to $\lambda b$, therefore we are equalizing the incremental distances in both sides, per a pyramidal plane. In order to implement equation II-9, we need to add several central axes via the zero-point between the shorter sides of the base of pyramid, in the a-sides. Earlier we indicated that per each pyramidal plane, there are 360 refracting objects (3) comprised by 4 sides of the plane. Since we are adjusting the incremental distance to be equal in all sides (a and b), then the pyramidal plane features a number of refracting objects greater than 360 (=360×2 b/a).

The angle ε between two adjacent pyramidal cords (2) from the summit point S can be determined. At the side-b, between points F and f1, it is $$\tan \varepsilon b = \frac{\lambda b}{SF} \qquad \text{(II-10)}$$

The above equation can be written as a function of the inclination angle ψa $$\varepsilon b = \tan^{-1}\left(\frac{\lambda b}{a/2} \sin \psi a\right) \qquad \text{(II-11)}$$

Similarly, we can determine the angle εa between two adjacent pyramidal cords (2) from the summit point at the side-a, between points K and k1, as a function of ψb $$\varepsilon a = \tan^{-1}\left(\frac{\lambda a}{b/2} \sin \psi b\right) \qquad \text{(II-12)}$$

By replacing λa by λb for equal incremental condition in equation II-12, then εa is $$\varepsilon a = \tan^{-1}\left(\frac{\lambda b}{b/2} \sin \psi b\right) \qquad \text{(II-13)}$$

The angle between two adjacent cords becomes constant for all four sides (εa=εb), but each side has its own number of cords and its number of refracting objects (3).

Each pyramidal cord at the corner has four inclinations: from the vertical ψc, from the sides a and b, and toward the diagonal c (the complement angle to ψc equal to π/2−ψc). The inclination of the pyramidal cord at the corner from sides a and b are determined in the next section. The major pyramidal cord at half side-a has three inclinations: ψb from the vertical line, from the horizontal, φa0, which is equal to π/2 and the third inclination is the complement angle to ψb. Similarly, the major pyramidal cord at half side b has three inclinations: ψa from the vertical line, from the horizontal, φb0, which is equal to π/2 and the third inclination is the complement angle to ψa.

II-2) the Sub-Pyramidal Cords of the Main Pyramidal Plane

The sub-pyramidal cords are all cords that are not located at the corners and half sides. The sub-pyramidal cords have three inclinations from the horizontal sides (a or b), from the vertical line, and the complement angles to their vertical inclinations. At the a-side (AB), the first sub-pyramidal cord Sk1 has a horizontal inclination φa1 and a vertical inclination ψb1, as shown in FIG. 13. The horizontal inclinations φa1 is equal to π/2−εa. The angle εa can be found as a function of the axial angle α which is constant in 2 π radian $$\varepsilon a = \tan^{-1}(\tan \alpha \sin \psi b) \qquad \text{II-14}$$

In the above equation we did not apply the condition for equalizing the distance of separation (λa=λb) as presented in the previous section. Then the horizontal inclination φa1 is $$\varphi a1 = \pi/2 - \tan^{-1}(\tan \alpha \sin \psi b) \qquad \text{II-15}$$

Consequently, the horizontal inclination of the second sub-pyramidal cord (Sk2) from main cord SK, φa2, is equal to $$\varphi a2 = \pi/2 - 2\tan^{-1}(\tan \alpha \sin \psi b) \qquad \text{II-16}$$

In general, we can refer to the horizontal inclinations of the inclined pyramidal cords from the main cord SK (right and left) as $$\varphi a(i) = \pi/2 - (i)\tan^{-1}(\tan \alpha \sin \psi b) \qquad \text{II-17}$$

For when i is equal to zero; φa0=π/2, which is the horizontal inclination of the main pyramidal cord located at the half side-a. Equation II-7 is therefore the general form of horizontal inclination of all pyramidal cords (and consequently the refracting objects) at the side-a (AB and CD) for equal axial degree (α) and for different axial separation; λa≠λb.

Similarly, we can deduce the general form of the horizontal inclination of pyramidal cords at side-b (AD and BC):

$$\varphi b(i) = \pi/2 - (i)\tan^{-1}(\tan \alpha \sin \psi a) \qquad \text{II-18}$$

The vertical inclination ψb1 of the first sub-pyramidal cord Sk1 at a-side (AB), can be found (FIG. 13)

$$\psi b1 = \tan^{-1}\left(\frac{\text{line } 0k1}{p}\right) \qquad \text{II-19}$$

$$\psi b1 = \tan^{-1}\left(\frac{b/2\cos\alpha}{p}\right) \qquad \text{II-20}$$

The vertical inclination of the second sub-pyramidal cord (Sk2) from the main cord, ψb2, is equal to $$\psi b2 = \tan^{-1}\left(\frac{b/2\cos 2\alpha}{p}\right) \qquad \text{II-21}$$

In general, we can refer to the vertical inclinations of the sub-pyramidal cords at the a side (AB and CD) from the main cord SK (right and left) as $$\psi bi = \tan^{-1}\left(\frac{b/2\cos(i\alpha)}{p}\right) \qquad \text{II-22}$$

For when i=zero; ψb0 is given by equation II-2, but we kept the notation of the vertical inclination of the major cords without the subscript of zero.

Similarly, we can deduce the general form of the vertical inclinations of pyramidal cords at side-b (AD and BC)

$$\psi ai = \tan^{-1}\left(\frac{a/2\cos(i\alpha)}{p}\right) \qquad \text{II-23}$$

The horizontal inclinations of the pyramidal cords at the corners A, B, C and D toward side a-and-b are at the end-points of equations II-22 and II-23.

II-3) the Inferior Pyramidal Planes with Reduced Height: The Inferior Pyramidal Steps The most important question where to place the second, the third, the fourth inferior planes and so on till we reach near the center. The inferior pyramidal planes refer to all 3-D planes located between the vertical height S-0 of the pyramid and the outermost pyramidal plane (ABCD at the base and A1B1C1D1 at the upper surface) The main pyramidal plane is determined from the initial data (dimension of the pyramid a, b and the height of the pyramid p which is a function of the focal length), the thickness of the flat lens H and the reduced height h, which is slightly lesser than the thickness of the flat lens. The reduced height h is needed in the design of the flat lens in order to calculate the inferior pyramidal steps $\Delta ci$ ($\Delta c1$, $\Delta c2$, $\Delta c3$, ... $\Delta ci$) for the inferior pyramidal planes measured at the main diagonals of the base rectangle. Labels of the pyramidal planes and their inferiors (1, 1-1, 1-2, ...) are not indicated in FIGS. 14 to 19 because they are assembled at the reduced height h. Consequently, labels of the conjugated planes (7, 7-1, 7-2, ...) are not indicated in FIGS. 14 to 19 because they are assembled at the reduced height h.

Figure 14:
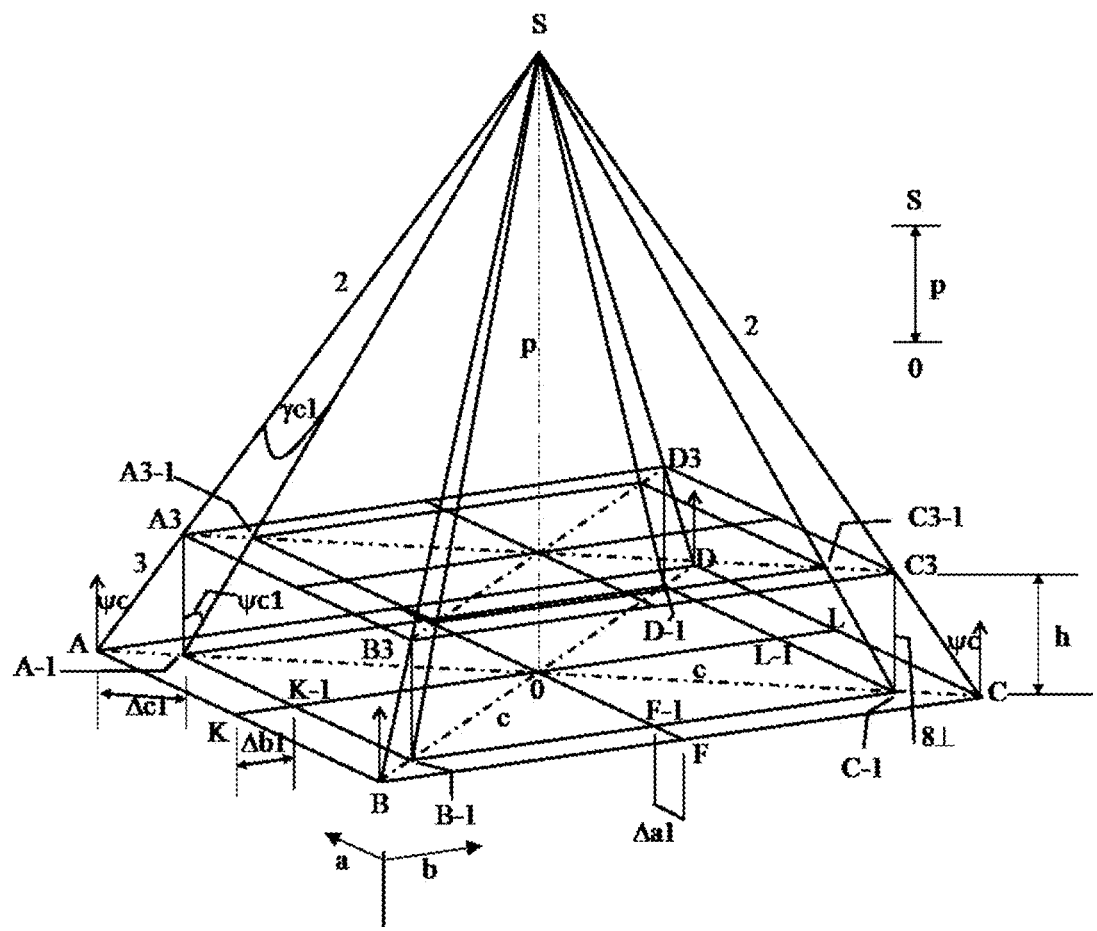
FIG. 14 Assembling the first inferior pyramidal plane with vertical height h inside a pyramid of height p, FIG. 15 Assembling the second inferior pyramidal plane at equal height h inside a pyramid of height p.
Figure 15:
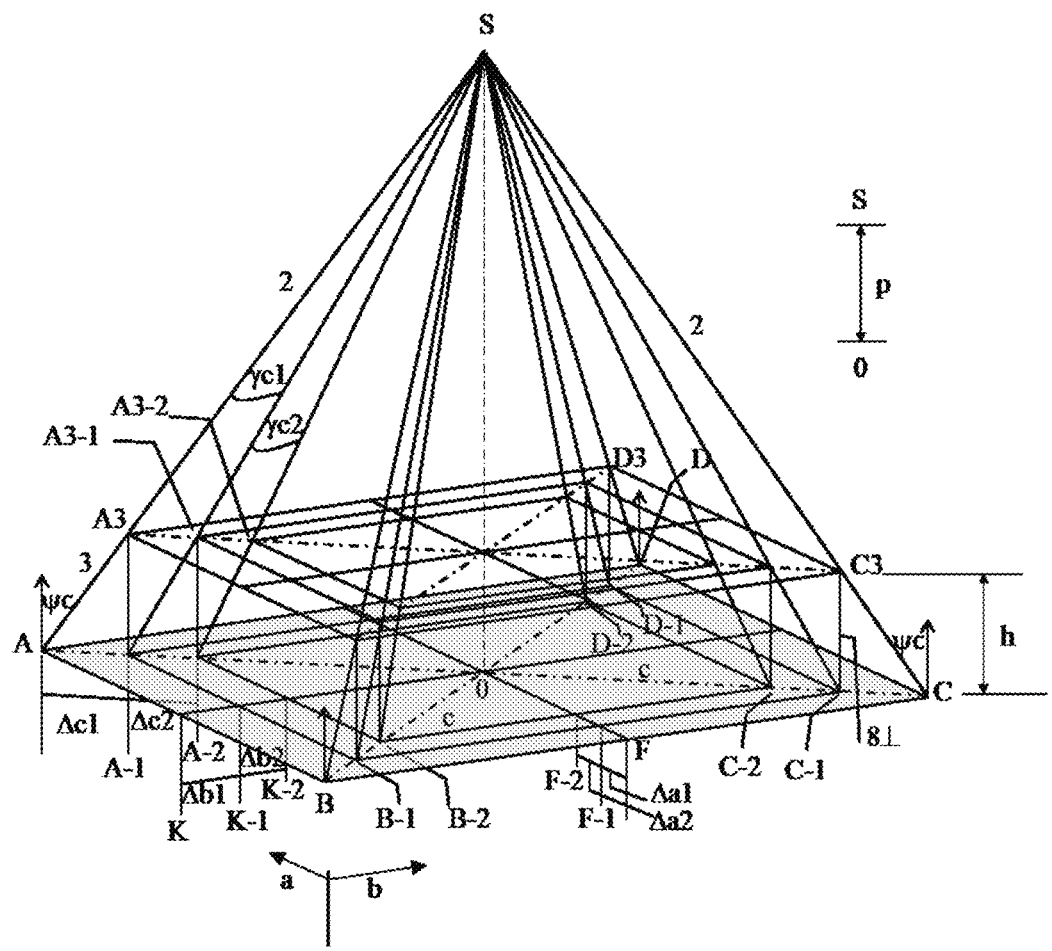

The main pyramidal plane comprising a base rectangle (ABCD) and upper rectangle (A3B3C3D3) with closed surface area at the sides, FIG. 14. The points of the upper rectangle A3B3C3D3 are only for the reduced height h and not for the actual height H. When we determine the actual height H of the flat lens we shall see that the base rectangle and the inferior pyramidal steps $\Delta ci$ remain unchanged for both heights h and H. Only the corresponding upper inferior pyramidal steps are changed when we move from height h to height H, but we do not need to evaluate it.

From the central point 0, we lift up a column with length h (from H we know h). The two major diagonals of all upper rectangle therefore results from the horizontal parallel lines to the base diagonals c at the height h. The first upper rectangle (A3B3C3D3) of the main pyramidal plane hence fits the intersection of the upper diagonals with the corner cords, four points, as shown in FIG. 14. Then we lay down four columns (8⊥ which is equal to h) from the upper corner points of the first rectangle at points A3, B3, C3, and D3 to intersect the base diagonals c. Hence, the base-rectangle of the first inferior pyramidal plane confines the points of intersection of the orthogonal columns with the base diagonals c; points A-1, B-1, C-1 and D-1. By connecting pyramidal cords from points A-1, B-1, C-1 and D-1 to the pyramid summit point S we assemble the first inferior pyramidal plane. The intersection of the cords of the first inferior pyramidal plane with the upper diagonals confines the upper rectangle of the first inferior pyramidal plane. The first inferior pyramidal step $\Delta c1$ is the distance of separation between the main (outermost) pyramidal plane and the first inferior pyramidal plane.

The second inferior pyramidal plane (FIG. 15) is assembled in a similar manner. From the upper rectangle of the first inferior pyramidal plane (A3-1, B3-1, C3-1, D3-1) we lay down four columns with h height (=8⊥) to meet the diagonals c of the base of pyramid at four points (A-2, B-2, C-2, D-2). Hence, the base-rectangle of the second inferior pyramidal plane confines the points of intersection of the orthogonal lines with the base diagonals c. By connecting pyramidal cords from points of intersection A-2, B-2, C-2 and D-2 at base of the second inferior pyramidal plane to the pyramid summit point S we assemble the second inferior pyramidal plane. The second inferior pyramidal plane is the surface area at the sides with vertical height h. The vertical height of both pyramidal planes is constant and equal to h. The second inferior pyramidal step $\Delta c2$ is the distance of separation between the first and second inferior pyramidal planes. The corresponding inferior pyramidal steps at the half sides a-and-b, $\Delta ai$ and $\Delta bi$, are not equal to $\Delta ci$ but they are not needed to assemble the inferior pyramidal planes.

Figure 16:
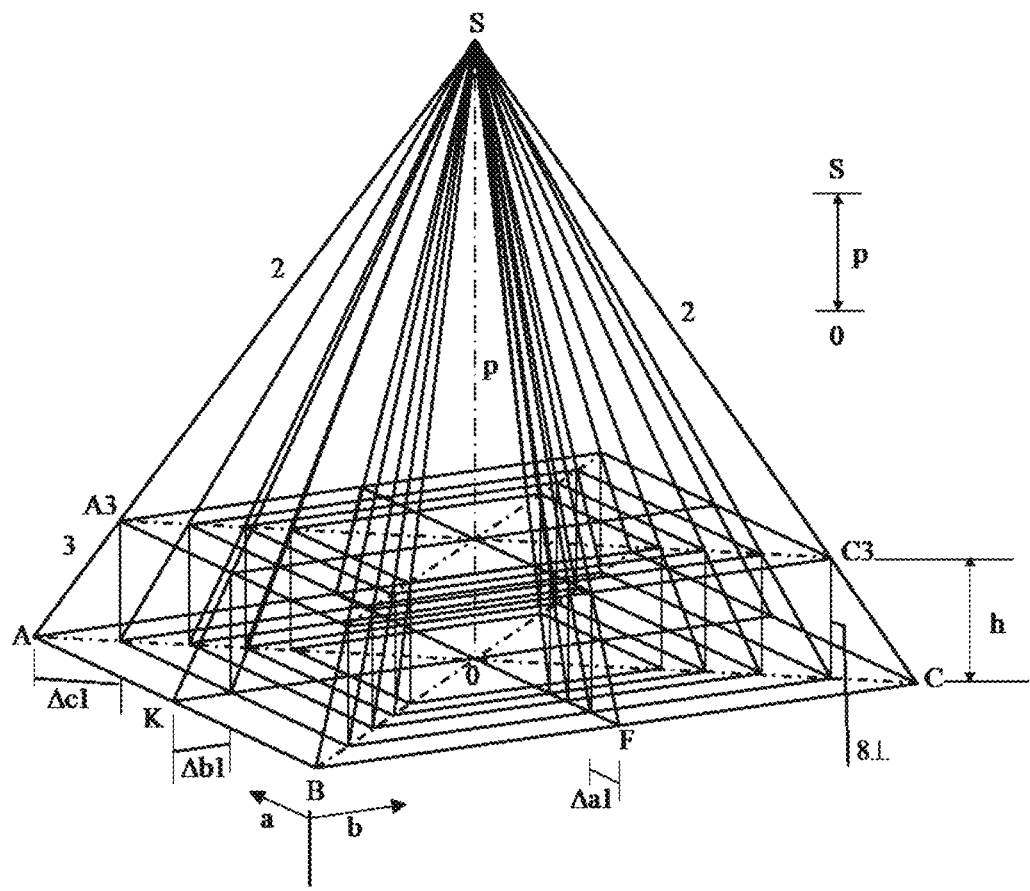
FIG. 16 Assembling the third inferior pyramidal plane at equal height h inside a pyramid of height p. The inferior pyramidal steps between two adjacent planes are getting smaller as we approach the center of pyramid.

The third inferior pyramidal plane is assembled in the above manner, FIG. 16, which includes also the main, the first and second inferior pyramidal planes.

Figure 17:
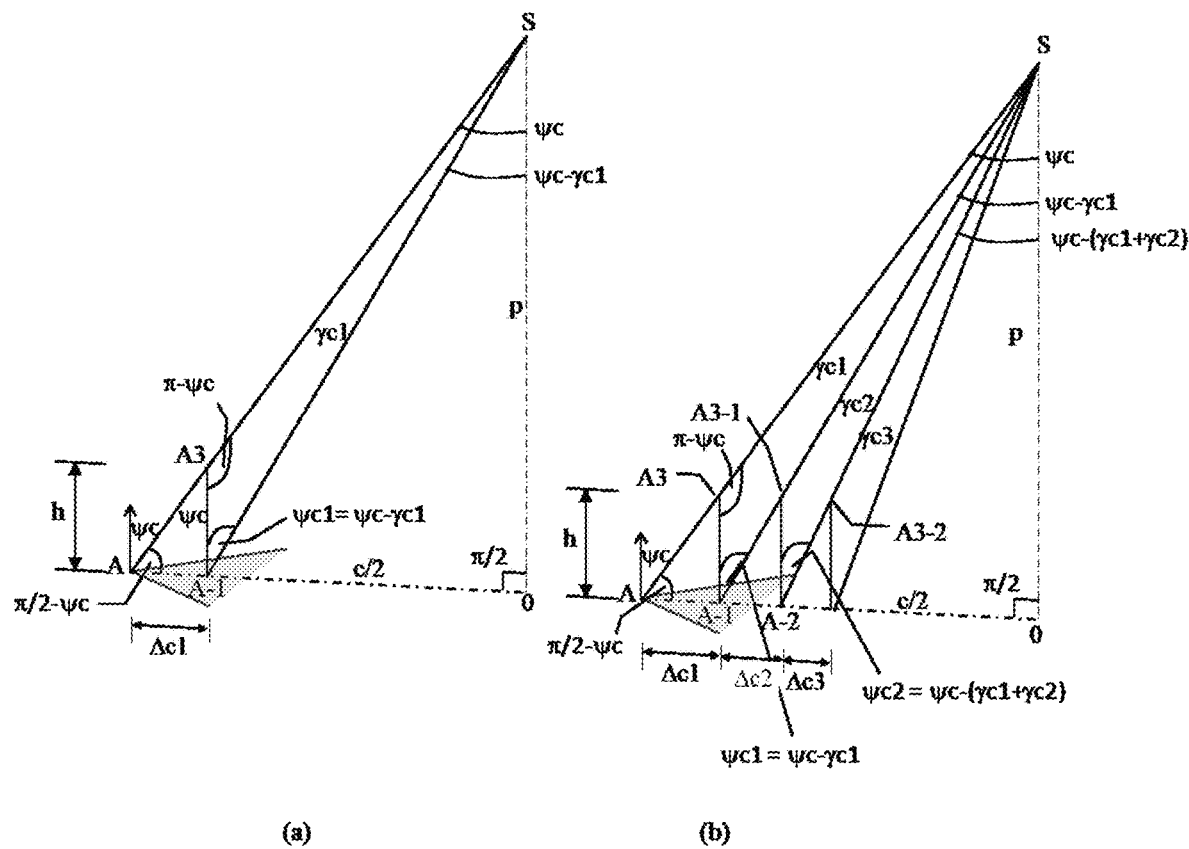
FIG. 17 (a) Trigonometric of the first inferior pyramidal cord at the diagonal c. (b) Trigonometric of the second and third inferior pyramidal cords at the diagonal c.

The first inferior pyramidal step is found from the trigonometric shown in FIG. 17-a:

$$\tan\psi c = \frac{\Delta c1}{h} = \frac{c/2}{p} \qquad \text{II-24}$$

Then;

$$\Delta c1 = h\frac{c/2}{p} \qquad \text{II-25}$$

The second inferior pyramidal step is found from FIG. 17-b:

$$\tan\psi c1 = \tan(\psi c - \gamma c1) = \frac{(c/2 - \Delta c1)}{p} = \frac{\Delta c2}{h} \qquad \text{II-26}$$

Then;

$$\Delta c2 = h\left(\frac{c/2 - \Delta c1}{p}\right) \qquad \text{II-27}$$

The third inferior pyramidal step is found from FIG. 17-b:

$$\tan\psi c2 = \tan(\psi c - (\gamma c1 + \gamma c2)) \qquad \text{II-28}$$
$$= \frac{(c/2 - (\Delta c1 + \Delta c2))}{p}$$
$$= \frac{\Delta c3}{h}$$

Then;

$$\Delta c3 = h\left(\frac{c/2 - (\Delta c1 + \Delta c2)}{p}\right) \qquad \text{II-29}$$

The general form of the inferior pyramidal step $\Delta ci$ measured at the diagonal c of the base of pyramid of height p can be written as (for i>0):

$$\Delta ci = \frac{h}{p}\left(c/2 - \sum_{i-1} \Delta ci\right) \qquad \text{II-30}$$

The number of i gives the order of the inferior pyramidal plane. The first inferior pyramidal step $\Delta c1$ is when i=1, the second term of the right hand side of equation II-30 vanishes. The second inferior pyramidal step $\Delta c2$ is when i=2, the second term of the right hand side of equation II-30 becomes $\Delta c1$ and so on.

Figure 18:
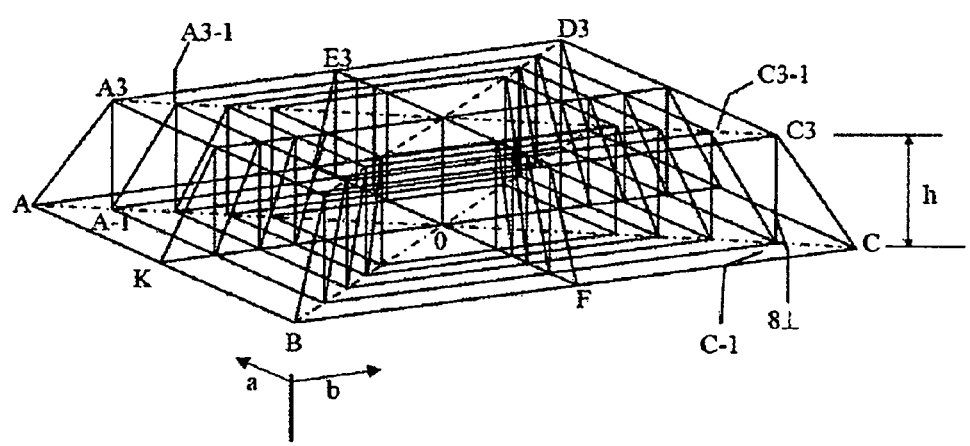
FIG. 18 (a) The inferior conjugate and pyramidal planes at equal height h. (b) The pyramidal planes are shown separately. (c) The conjugate planes are shown separately.
Figure 18:
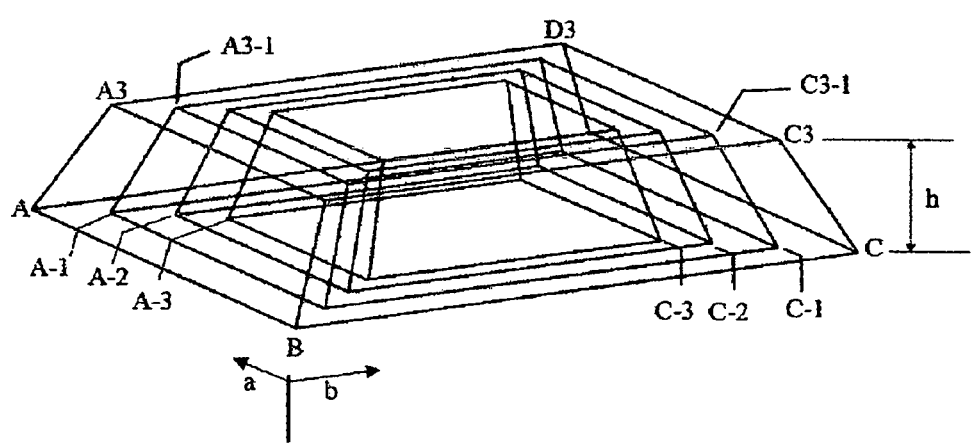
Figure 18:
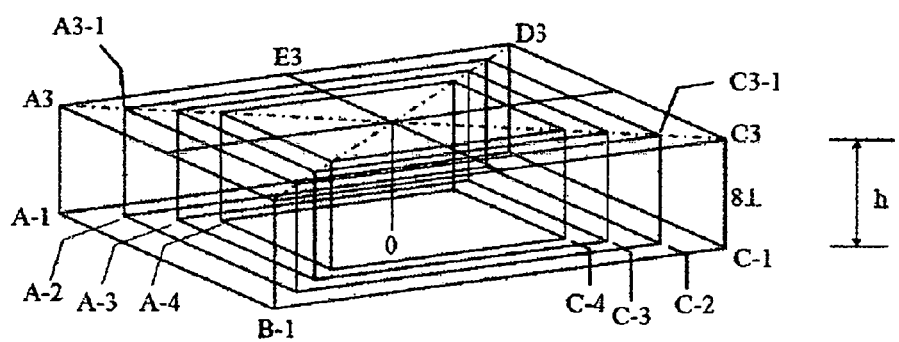

The main pyramidal planes and three inferiors along with the conjugated planes are shown in FIG. 18 (a). The main pyramidal and three consequent inferiors pyramidal planes are shown separately in FIG. 18 (b). The conjugate to pyramidal planes are shown in FIG. 18 (c), they are concentric planes. All planes have equal vertical height h, their lower bases lie in one plane and their upper rectangles lie in one plane.

Figure 19:
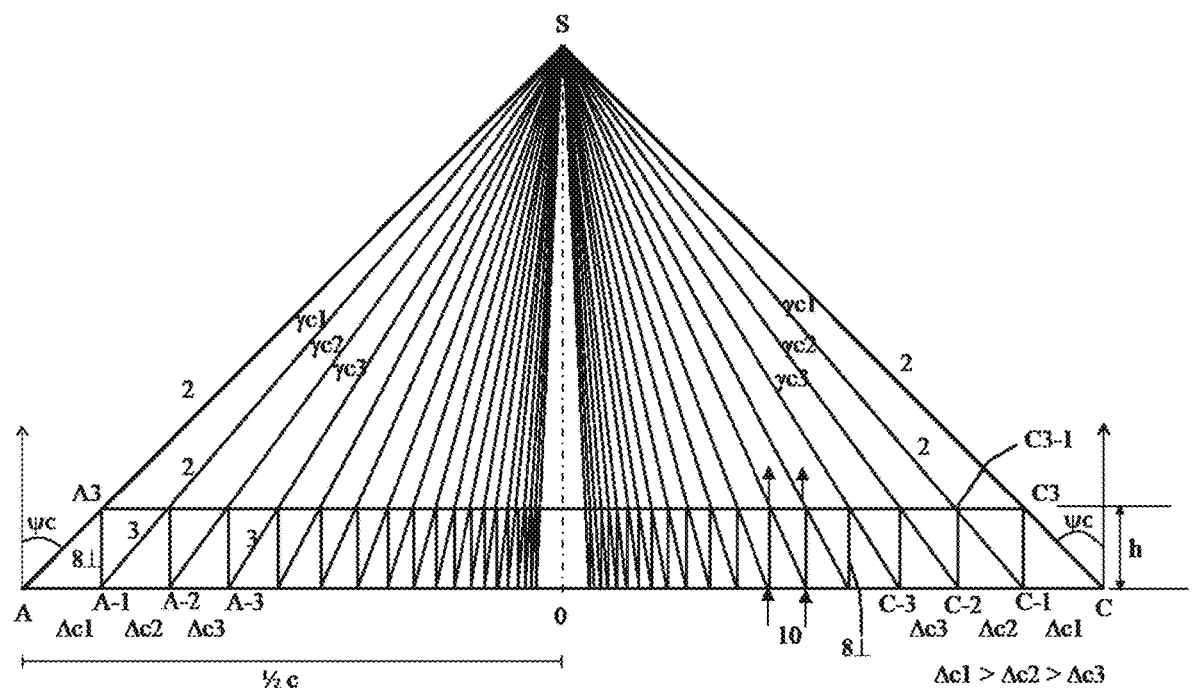
FIG. 19 An axial cross section of inclined conjugate and pyramidal planes at the diagonal c with the note that parallel light rays suffer no refraction at the points of intersection when hit the refracting object.

If we look at the cross section of combined planes; pyramidal and the conjugate planes at the diagonal c (AC), FIG. 19, we see that it looks like accordion musical instrument compressed at the center. The reason why the reduced height h is not suitable for the flat lens because when parallel light rays (10) hit the points of intersection of pyramidal and conjugate planes it does not encounter any portion of the refracting object (3). It can be said that these points behave as multi-center points. Only one zone at the center in the flat lens is not filled with any plane so that light rays pass this zone without any refraction.

II-4) the Main and Inferior Pyramidal Planes at the Actual Height H (Thickness)

To avoid the multi-center points we shift the upper rectangles to an incremental distance δh (FIG. 20-a) without changing the inferior pyramidal steps. This is accomplished by inclining the sides (8⊥) of the conjugate planes from vertical to an angle v, toward the center (or centripetal inclination). The choice of the incremental height δh depends on the dimension of the flat lens, which can be from nanometer to millimeters. The vertical inclination of the last inferior pyramidal plane therefore is less than the angle v and the size of the central zone is defined. The central height of the pyramid p has zero inclination, thus the nearest cord to the axis p is the cord that has vertical inclination less than v.

By inclining the edge of the first inferior conjugate plane toward the center by angle v, the upper points A3, B3, C3, D3 are raised to A1, B1, C1, D1 such that the vertical height of all planes becomes H which is greater than h. The lower points remain the same as shown in the reduced height (h) diagram. Therefore assembling the main and inferior planes at height H is as following.

Figure 20:
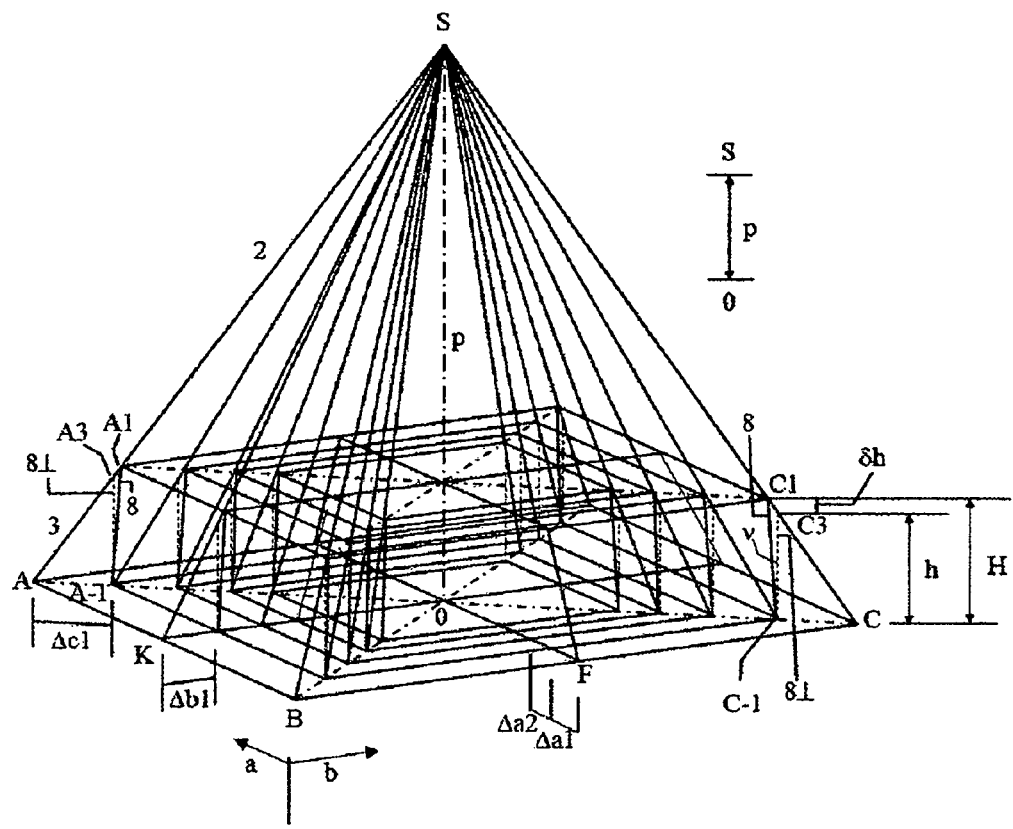
FIG. 20 (a) The main and inferior pyramidal planes at the actual height H. The conjugate planes are inclined inward from their vertical positions by a small angle v. (b) Assembling the main and inferior pyramidal planes at the actual height H.
Figure 20:
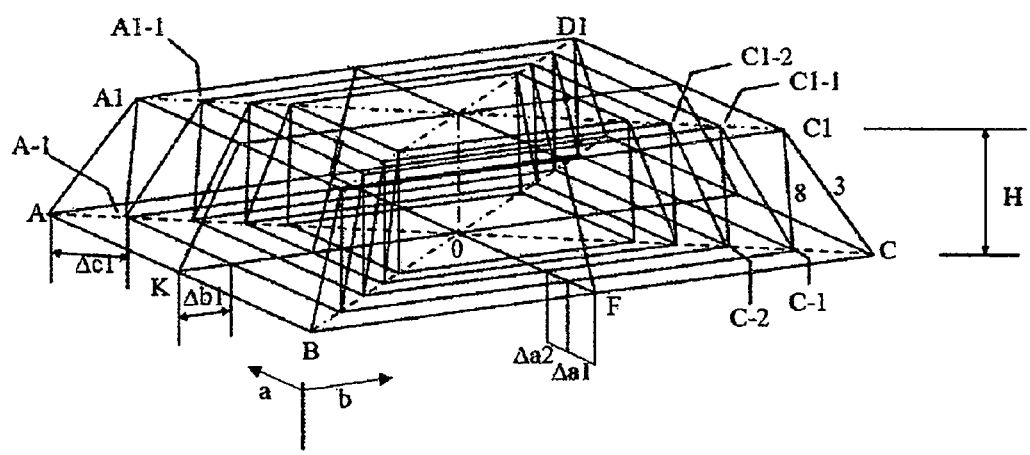

From the central point 0, we lift up a column with height H. The two major diagonals of all upper rectangle therefore results from the horizontal parallel lines to the base diagonals c at the height H. The first upper rectangle (A1B1C1D1) of the main pyramidal plane hence fits the intersection of the upper diagonals with the corner cords, four points, as shown in FIG. 20-b. Then we lay down four inclined columns (8), toward the center by angle v from the vertical line, from the upper corner points of the first rectangle at points A1, B1, C1, and D1 hence to intersect the base diagonals c at points A-1, B-1, C-1 and D-1. Hence, the base-rectangle of the first inferior pyramidal plane confines the points of intersection of the inclined columns with the base diagonals c; points A-1, B-1, C-1 and D-1. By connecting points A-1, B-1, C-1 and D-1 with pyramidal cords to the pyramid summit point S, hence we assembled the first inferior pyramidal plane. The intersection of the pyramidal cords of the first inferior pyramidal plane with the upper diagonals confines the upper rectangle of the first inferior pyramidal plane. The first inferior pyramidal step Δc1 is the distance of separation between the main (outermost) pyramidal plane and the first inferior pyramidal plane.

The second inferior pyramidal plane (FIG. 20-b) is assembled in a similar manner. From the upper rectangle of the first inferior pyramidal plane (A1-1, B1-1, C1-1, D1-1) we lay down four inclined columns (8), toward the center by angle v from the vertical line, to meet the diagonals c of the base of pyramid at four points (A-2, B-2, C-2, D-2). Hence, the base-rectangle of the second inferior pyramidal plane confines the points of intersection of the orthogonal lines with the base diagonals c. By connecting pyramidal cords from intersection points A-2, B-2, C-2 and D-2 at base of the second inferior pyramidal plane to the pyramid summit point S we assembled the second inferior pyramidal plane. The vertical height of both pyramidal planes is constant and equal to H. The second inferior pyramidal step Δc2 is the distance of separation between the first and second inferior pyramidal planes.

The third inferior pyramidal plane is assembled in the above manner, FIG. 20-b. The conjugate plane is with inclined side (8); which is the connections of the upper corners and lower corners of two adjacent pyramidal planes.

Figure 21:
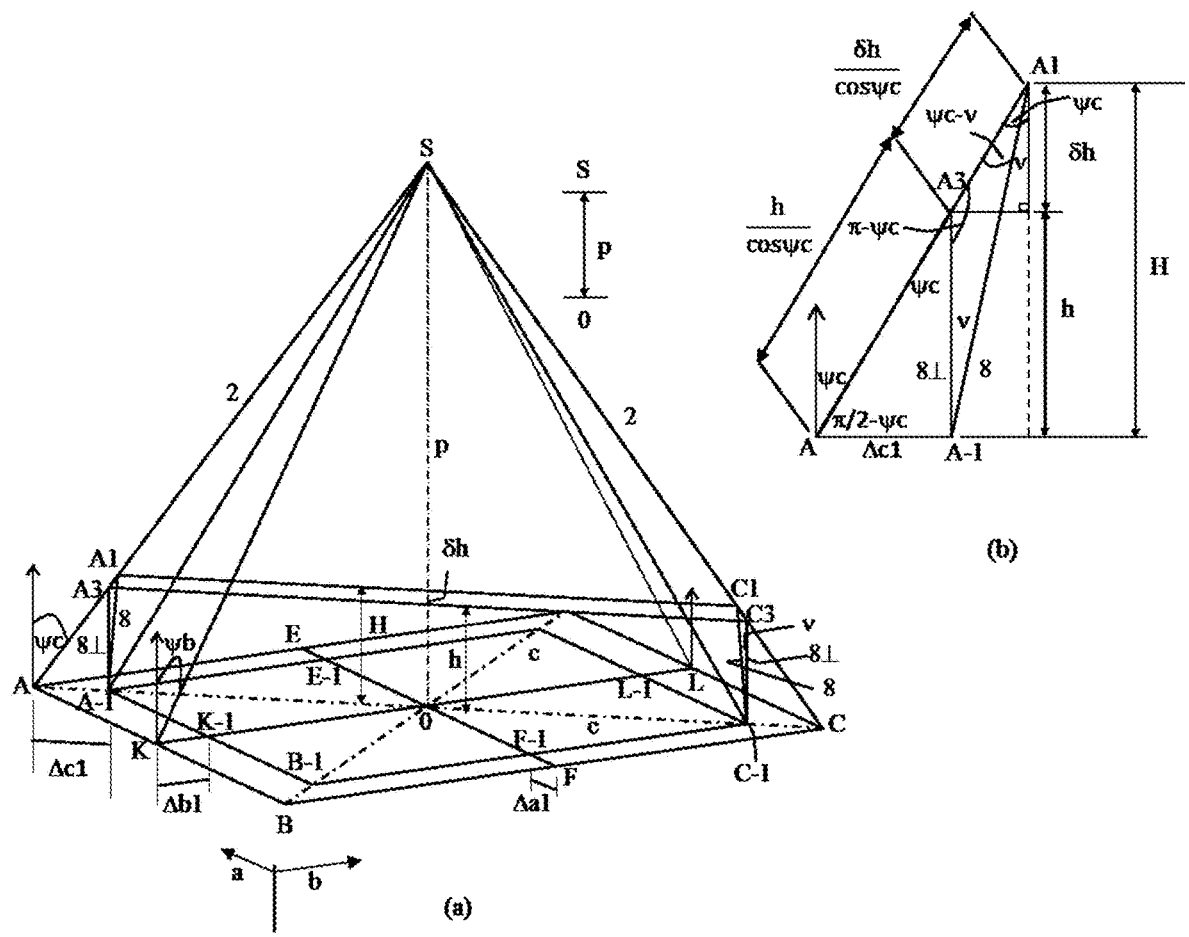
FIG. 21 (a) Trigonometric relation between the inclined and the vertical conjugate planes at the diagonal c. (b) Expanded view at the corner.

As shown in FIG. 21—a and b, the trigonometric relation between the actual height of the flat lens H and the vertical height h in the diagonal axis c (A-C). The edge of the vertical conjugate plane (8⊥) is inclined toward the center by an angle v so that the new edge is extended to longer length (8), FIG. 21-a. All inferior conjugate planes are inclined toward the center by an equal angle v. From the central point, both heights (H and h) are related:

$$H = \delta h + h \qquad \text{II-31}$$

From the expanded view (FIG. 21-b), between the corner A and inferior point A-1 we have $$\frac{\left(\frac{\delta h}{\cos \psi c}\right)}{\sin v} = \frac{h}{\sin \psi c - v} \qquad \text{II-32}$$

Solving for δ h $$\delta h = \frac{h \sin v \cos \psi c}{\sin \psi c - v} \qquad \text{II-33}$$

From equations II-31 and II-33 we have $$H = h\left(1 + \frac{\sin v \cos \psi c}{\sin \psi c - v}\right) \qquad \text{II-34}$$

Depending on the dimension of the flat lens the incremental height δh which is a function of v is chosen. The incremental height is for allowing the parallel light rays to suffer refraction at any point of the refracting object (3) whether light hit the upper or lower surface of the flat lens.

Figure 22:
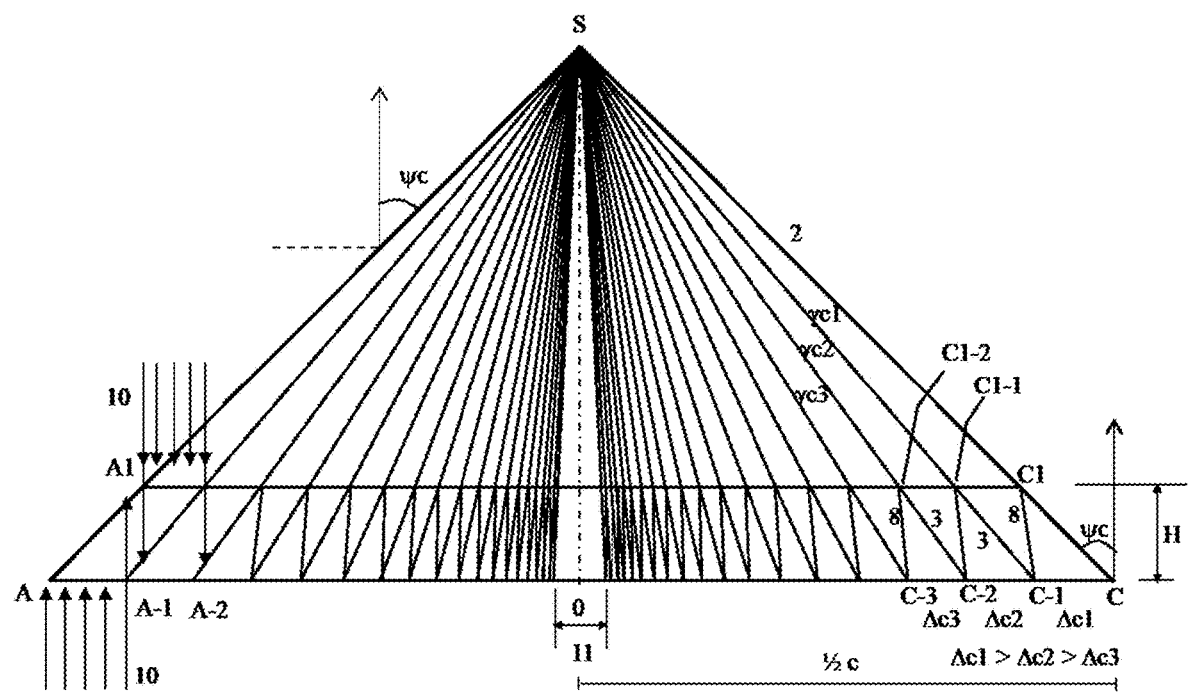
FIG. 22 An axial cross section of pyramidal planes and the inclined conjugate planes with the note that parallel light rays refract at the points of intersection when hit the refracting object.

As shown in FIG. 22, the cross section of combined pyramidal and conjugates planes at the diagonal c (AC); we see that when parallel light rays (10) hit the points of intersection of pyramidal and conjugate planes it encounter a portion refracting object (3) from top surface or from lower surface. Light only refracts from the pyramidal refracting object 3 as well as from the spacing between two adjacent objects (3-4-3). The zone that is indicated by number 11 is empty, it has no refracting object, and light rays pass this region without refraction. This zone is similar to the center point of a spherical (curved) lens. The lesser is the dimension of the empty zone (11), the smaller is the focal point. For example, if the width of the empty zone, say, 1 mm then the diameter of the focal point is 1 mm. The size of the focal point depends also on other factors, and this will be mentioned later.

Figure 23:
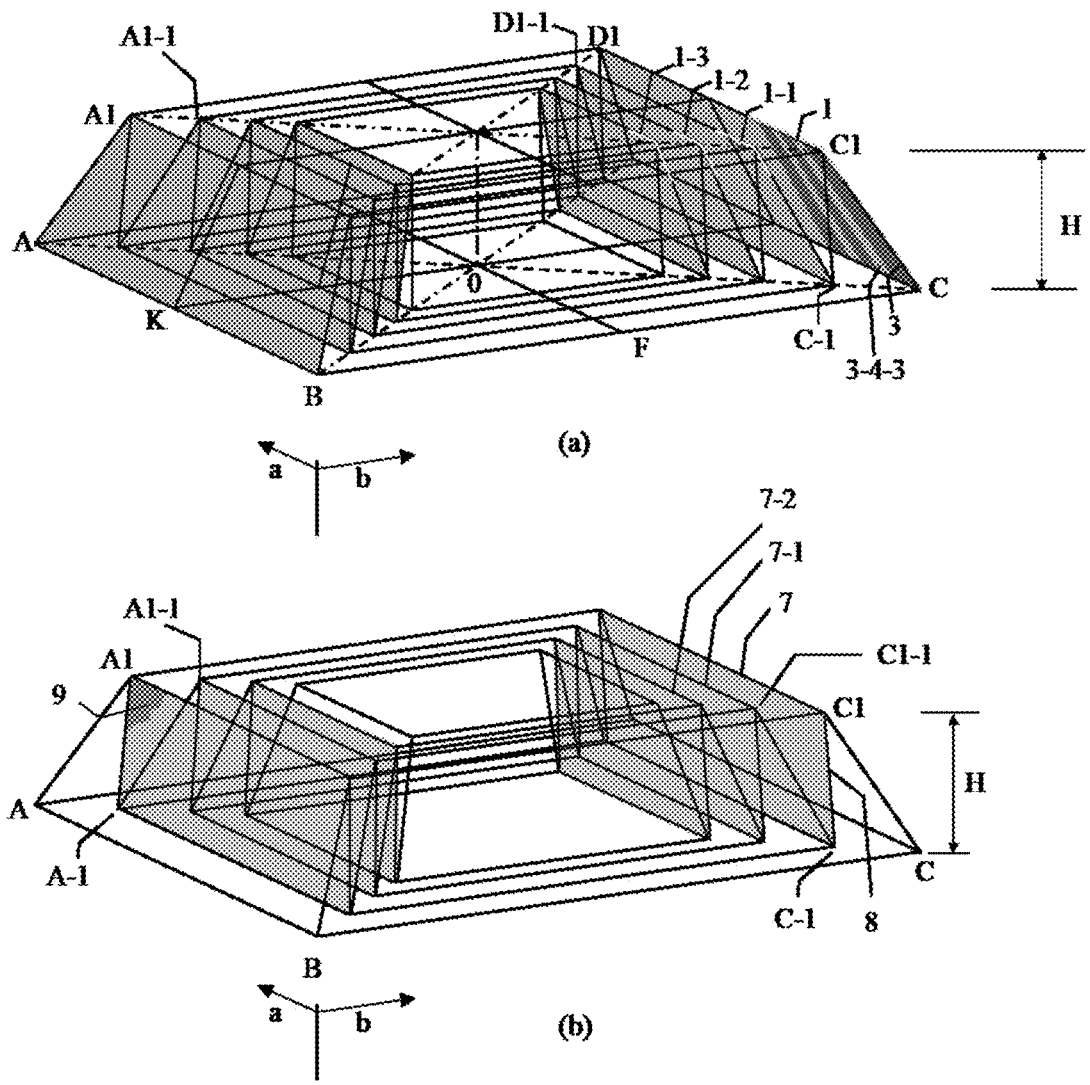
FIG. 23 (a) Highlight of the main and inferior pyramidal planes at the shorter side of the base with actual height H. (b) Highlight of the inclined conjugate inferior planes at the shorter side with actual height H.

Highlight of the main and inferior pyramidal planes are shown at shorter side-a of the flat lens, FIG. 23-a. Highlight of the inferior conjugate planes are shown at shorter side-a of the flat lens, FIG. 23-b. All conjugate planes are considered inferiors with respect to plane 1. The outermost 3-D rectangular plane with vertical height H is denoted III and presented before.

Figure 24:
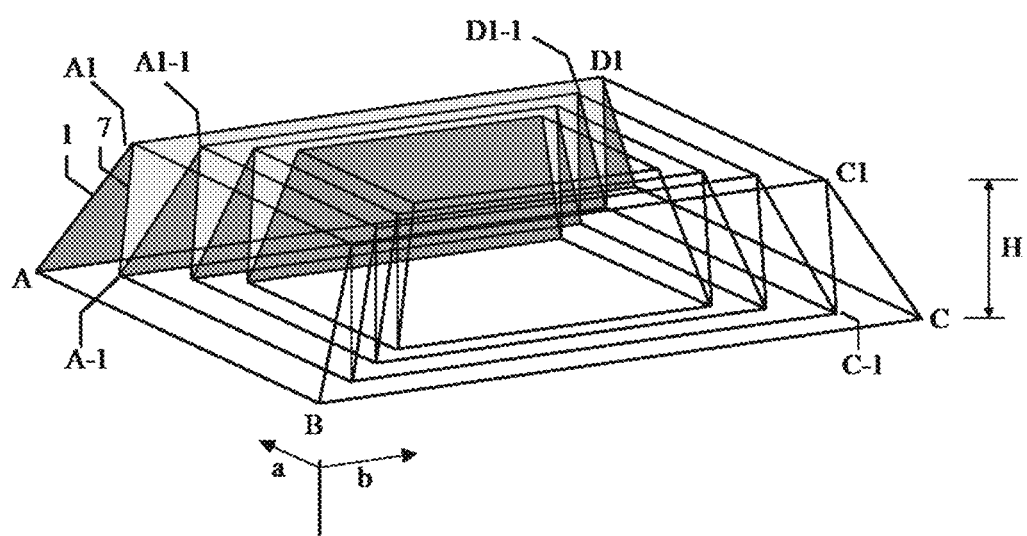
FIG. 24 Highlight of the generated volumes between the pyramidal and the inclined conjugate planes at the longer side.

The generated volumes from the combined planes (pyramidal and conjugates) at longer side-b are highlighted with different contrast and are shown in FIG. 24. These volumes are differentiated from their opening sides up and down.

Figure 25:
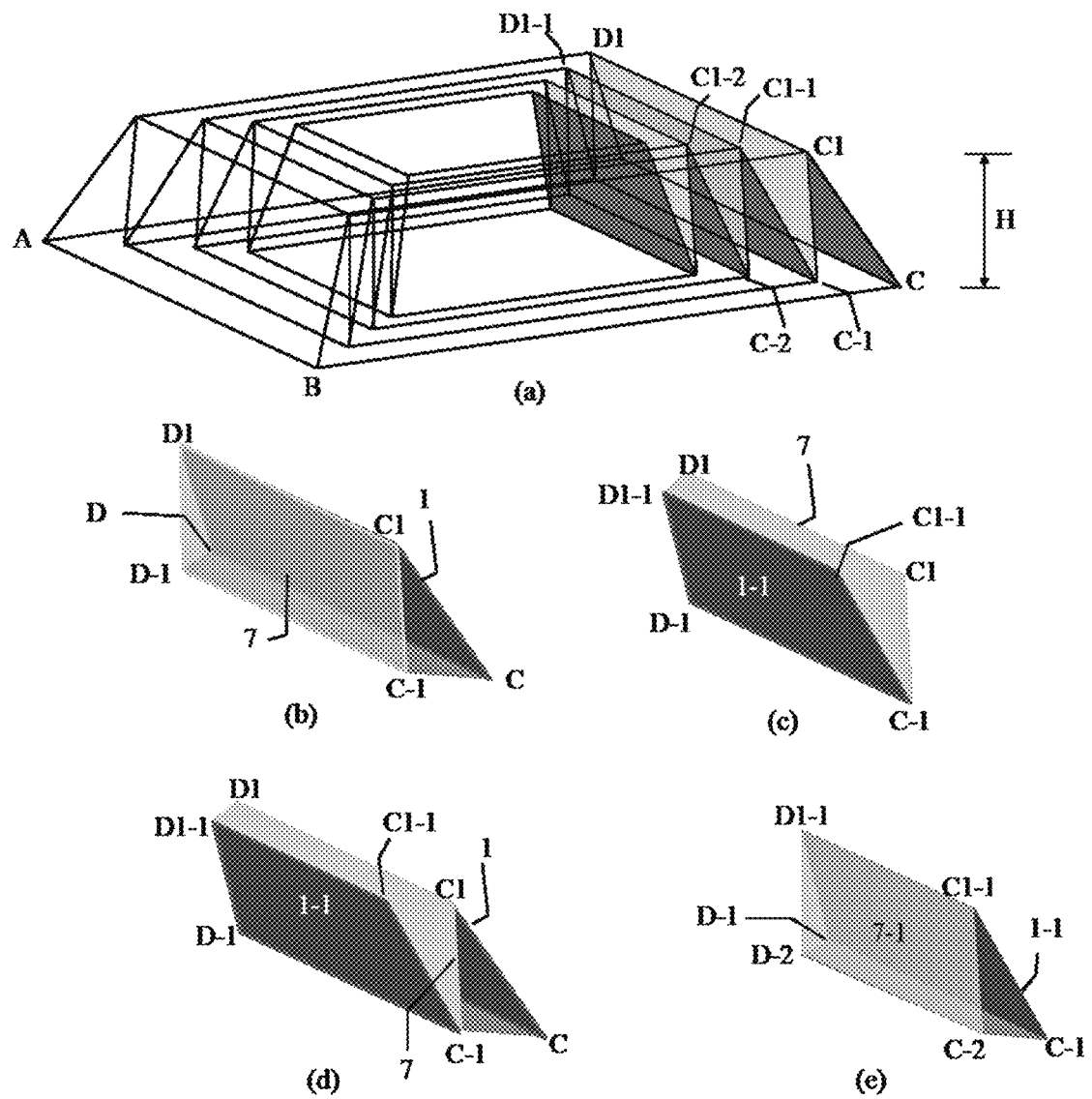
FIG. 25 (a) The shaped volumes is shown at the shorter side from the inclined conjugate planes and the pyramidal planes. (b) The first upward 3-D anvil. (c) The second downward 3-D anvil. (d) The grouped first and second 3-D anvils. (e) The third upward 3-D anvil.

The generated volumes from the combined planes (pyramidal and in conjugates) are highlighted with different contrasts at the shorter side-a of the flat lens, FIG. 25-a. We know that the generated volume between element III (rectangular) and the main pyramidal plane (1), FIG. 5, is an exterior. Consequently, the first inferior volume is between the main pyramidal plane (1) and the first inferior conjugate plane (7), FIG. 25-b, quarter plane is highlighted only. The first inferior quarter volume has a shape of an anvil. In the lower part, it has cross section area indicated by four points C, C-1, D, and D-1 whereas in the upper part it has a sharp area indicated by a line with two points C1 and D1. Hence, the first 3-D inferior anvil comprises the first main pyramidal plane (1) and the first inferior conjugate plane (7). The adjacent anvil (second inferior), quarter plane is only highlighted in FIG. 25-c, has an upper cross section area at four points C1, C1-1, D1, and D1-1, whereas its sharp area is at the lower portion indicated by the line with two points C-1 and D-1. With respect to a stationary frame of observer, if the first inferior anvil is upright hence the second inferior anvil is inverted. The second inferior anvil comprises the first inferior conjugate plane (7) and the first inferior pyramidal plane (1-1). The combined first and second inferior anvils is shown in FIG. 25-d, quarter planes are only highlighted. The third inferior anvil (FIG. 25-e) has a cross section area at the lower portion with four points C-1, C-2, D-1, and D-2 whereas its sharper area is at the upper part indicated by a line with two points C1-1 and D1-1. The third inferior anvil comprises the first inferior pyramidal plane (1-1) and the second inferior conjugate plane (7-1).

III) The Operation of the Pyramidal Flat Lens

III-1) the Fundamental of Light Ray Refraction

Figure 26:
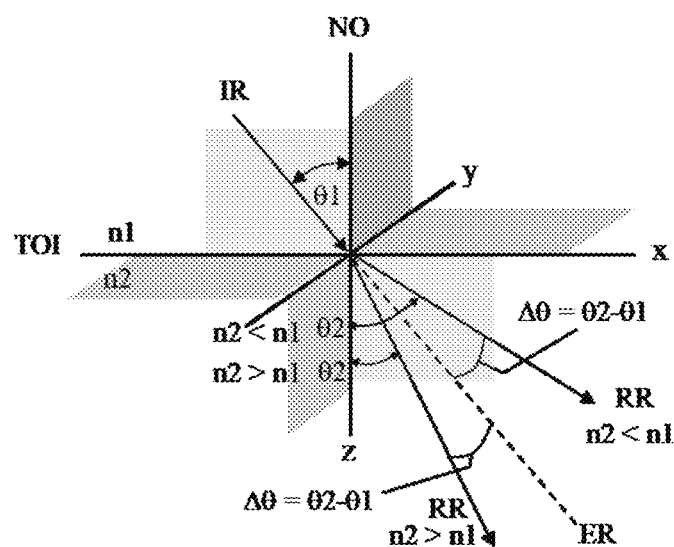
FIG. 26 The basic chart of inclined light ray refraction from horizontal plane. The abbreviations shown in this diagram are also indicated in the following diagrams.

Light rays refracts (bending) from its straight pass when it cross two transparent regions owing different index of refractions under the condition that one of the regions is inclined with respect to light ray or vice versa, the inclination angle in this case must be greater than zero but less than $\pi/2$. The angle of refracted ray, referred here by $\theta 2$, is greater than the incident angle referred here by $\theta 1$ but less than or equal to $\pi/2$. Both angles are measured with respect to the normal of the surface as shown in FIG. 26; however, both angles can be measured with respect to the surface. The difference between the incident $\theta 1$ and refracted $\theta 2$ angles, $\Delta\theta$, leads to the degree of variation of the bended ray. We need to apply a three-dimensional coordinate system in order to describe the refraction of light rays. For non-curved surfaces, the proper coordinate is the Cartesian system x, y and z. In the Cartesian system, we have three planes; these are x-y, y-z and x-z. Thus, one plane confines the pass of incident light ray and the refracting light ray. FIG. 26 demonstrates the fundamental of light ray refraction. In the present case, light strikes the surface at axis x with inclination angle $\theta 1$ from the plane x-z and emerging from the plane x-z. It can be either the surface is inclined or light ray is inclined. The notations shown in the diagram stands for: IR (incident ray), TOI (tangent or interface), NO (normal), n1 and n2 refer to entry and exit index of refraction regions, $\theta 1$ and $\theta 2$ refer to incident and exit angles of refracted ray RR, and ER stands for extended ray. The incident ray, the refracting ray and the normal has to be confined in one plane. The notation of this diagram hereafter will be shown frequently in the following diagrams.

Figure 27:
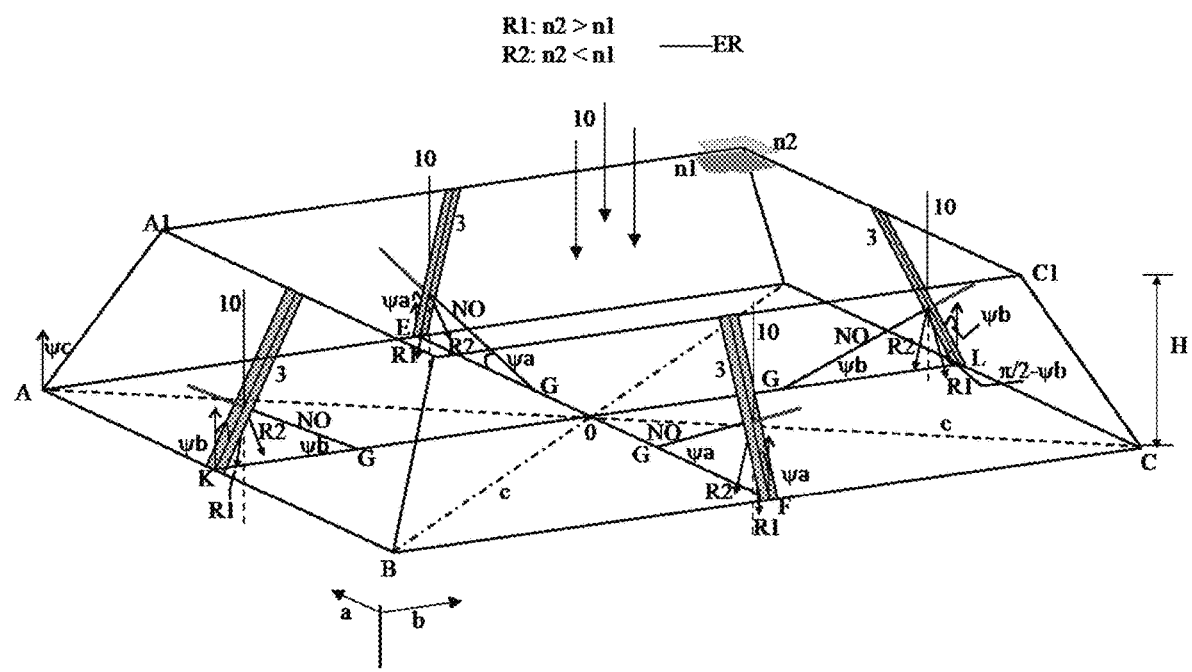
FIG. 27 Parallel light rays refraction from pyramidal refracting object at the half-sides, light rays move downward. The perpendicular line of the refracting object must intersect with the base axis forming the degree of the inclination for any given pyramidal plane.

The refraction of light rays from pyramidal plane (refracting object 3 and spacing 3-4-3) is also described in the Cartesian coordinate system. However, because each pyramidal plane comprises 360 refracting objects (3) distributed within the base axes thus light rays refraction must be described in $2\pi$ radians. We need to define the orientation of the inclined refracting object (3) with respect to the striking ray (10) that undergoes refraction, and how to define the normal to the surface (3). The axis of the refracting object (3) is just the pyramidal cord (2); the pyramidal cord forms a half triangle with the base axis (360 axes in 2 $\pi$-radian). A complete triangle comprises two refracting objects facing each other through the base axis via the zero point, from both sides. Thus, the normal to the refracting object has to be a line lies within the triangle plane; the normal has be at the point in which light ray strikes the surface, the extension of the normal has to cross the corresponding base axis; or the extension of the normal has to cross the zero point for an extended object. Let us consider the refracting object (3) is oriented vertically then the base axis is the normal, in this case. If the refracting object (3) is inclined from the vertical by angle $\psi$, which is the true case, then the normal is the inclined line from the base axis by an equal angle $\psi$. These are the fundamental of light ray refraction from the pyramidal plane. FIG. 27 describes the refraction of light rays when parallel light rays (10) strike the pyramidal plane from top (smaller surface area) in four positions. Here light strikes and emerges through a diverging inclined system.

Figure 28:
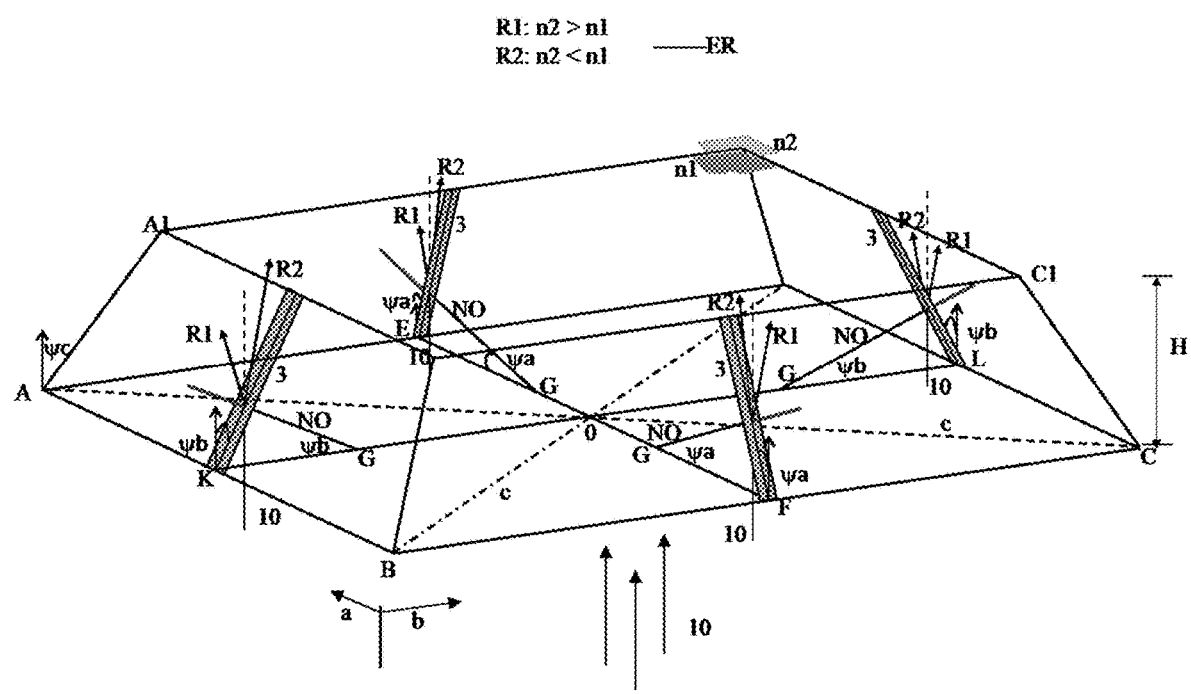
FIG. 28 Parallel light rays refraction from pyramidal refracting object at the half-sides, light rays move upward. The perpendicular line of the refracting object must intersect with the base axis forming the degree of the inclination for any given pyramidal plane.

Whereas FIG. 28 describes the refraction of light rays when parallel rays (10) strike the pyramidal plane from base at the same four positions. Here light strikes and emerges through a converging inclined system. In both cases, the normal is the line crossing the base axis at point G with inclination equal to the inclination of the refracting object (3). This is can be easily verified trigonometrically; the complement angle to the vertical inclination of object 3 is $\pi/2-\psi$, then the normal is inclined with respect to the base axis by the same angle $\psi$. The normal, the refracting object and the base axis lies within one triangle domain. The incident angle in all cases is the angle between incident light ray (10) and the normal, which is equal to ($\pi/2-\psi$), as will be shown later. The exit angle is between the normal and the refracted ray. It can be concluded, from both diagrams that; a negative flat lens is operated when light crossing a diverging inclined system (FIG. 27) and on the other hand, a positive flat lens is operated when light crossing a converging inclined system (FIG. 28).

III-2) Adaptization the Pyramidal Flat Lens

The flat lens is composed of several opening volumes shaped in 3-D anvils result from connecting pyramidal plane and its conjugate; they are oriented with one in the reverse of the other in sequence order. These volumes begin to shrink from the boarder to as we approach the centerline but at constant vertical height H (thickness of the lens). Each pyramidal plane has its 360 refracting objects (3) and equivalent number of spacing 3-4-3. These objects must be distinct by its thickness from the pyramidal plane (4), and must be distinct from the filling materials. The refracting objects are made at the side of light entry even though they can be in both sides (4in and 4out). The refracted ray moves at the interface between two adjacent volumes but tangent to the surface of the inclined refracting object 3 or 3-4-3 with the condition that will be explained later.

The volume facing the side of light entry (light ray pass through it) can be made or filled with medium of index of refraction n1 whereas elements 3 and 3-4-3 can be made from other index of refection n2. With the condition, element 3 is distinct after filling its volume, e.g. consider filling the volume facing light entry with nylon and element 3 is made of glass. In this case, the inverted volume can be left without filling. This is true for the ideal lens. In the ideal lens, light rays pass tangent to the refracting objects for exact composition of the index of refraction and perfect inclination.

However, we need to fill the inverted volume with respect to the volume of light entry for the simplified flat lens. Any slight change in the composition of the refractive index will divert the refracted ray its path from the interface surface hence crossing the inverted volume with respect to light entry; the total internal reflection (is avoided as will be shown later). In this case, the filled volume at the side of light entry and the refracting objects would have the same index of refraction but they differ in density, for example, if the filled material is chosen nylon (n=1.53) and the refracting objects can be made from barium crown BaK2 (n=1.539). And, the inverted volume is filled with n2. The void zone (11) at the center is left unoccupied (void) by any plane but it is filled with any transparent medium so parallel light rays are orthogonal to the zone, hence emerging without any refraction, similar to the center of the spherical lens.

Figure 29:
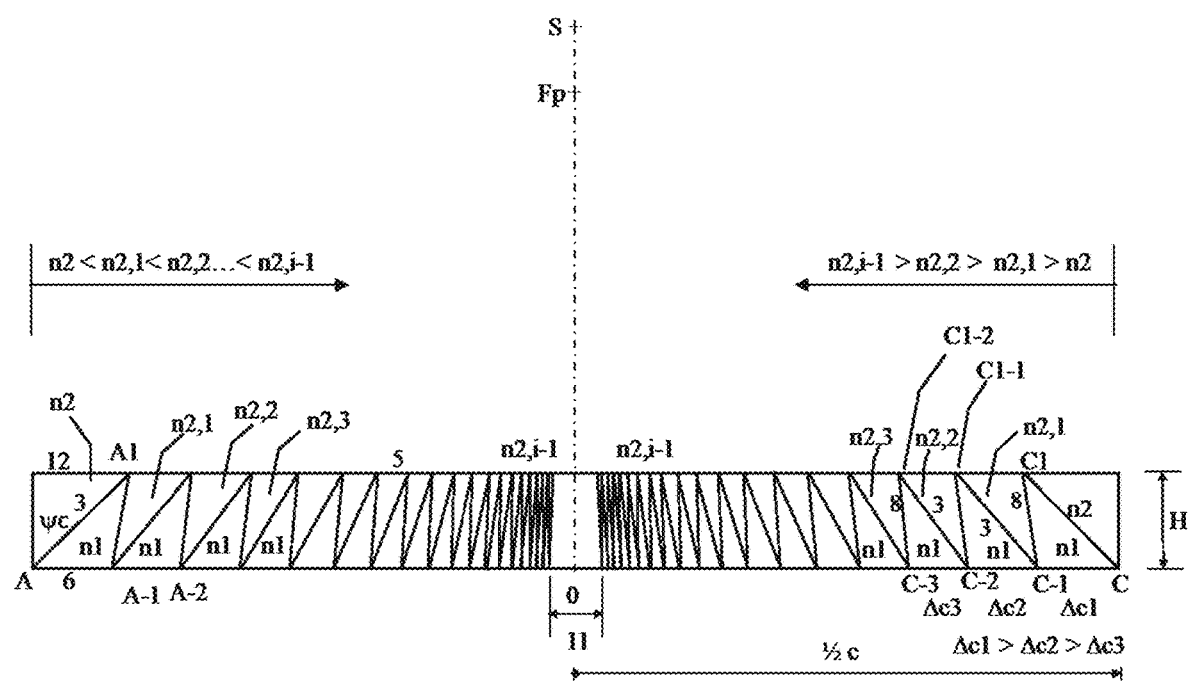
FIG. 29 Adaptization of the ideal pyramidal flat lens at the diagonal c.

FIG. 29 is a cross section of the pyramidal and conjugate planes at the diagonal c for the ideal and simplified flat lenses.

The inclination of the outer (main) pyramidal plane is given by ψc which is less than π/2 and as we approach the center the inclination of the inferior pyramidal planes gets smaller and smallest at the center, approaching 0 at the center line. The greatest vertical inclination (smooth inclination) is at the boundary of the lens, ψc, whereas the least vertical inclination (stiff inclination) is near the center of the flat lens. According to equation III-7, the maximum refracted angle (90° from the normal) occurs for when the argument of III-8 is equal to one; that is $$\frac{n1}{n2}\cos\psi c = 1 \qquad \text{III-1}$$

The notation of the index of refraction at the light entry is given by n1 and at the exit is given by n2. The cosine term at the border is the least and near the center, it is greatest (ψc~0). In practice, we keep the left hand side term of equation III-1 less than one to avoid total internal reflection, which occurs for when the striking angle is greater than the critical angle for given two medium of refraction.

The ratio of n1 to n2 must be greater at the boarder than at the center in order to satisfy the condition of III-1. For converging and diverging flat lenses, n1 (light entry) is greater than n2 (light exit), but the filling reversed in the structure. Therefore, for constant n1, n2 is the least at the boarder than at the inferior.

For positive flat lens, the orientation of the index of refraction is shown in FIG. 29, whereas the orientation of the index of refraction for negative lens is the reverse, n1 will be in the upper volumes and n2 group will be at the lower volumes. Both the converging and diverging pyramidal flat lenses have the same structure.

The following descriptions of the converging and diverging pyramidal flat lenses are based on the simplified flat lens. Both lenses have the same focal length for the same pyramidal inclinations and optical properties.

III-2-1 Converging Pyramidal Flat Lens

Figure 30:
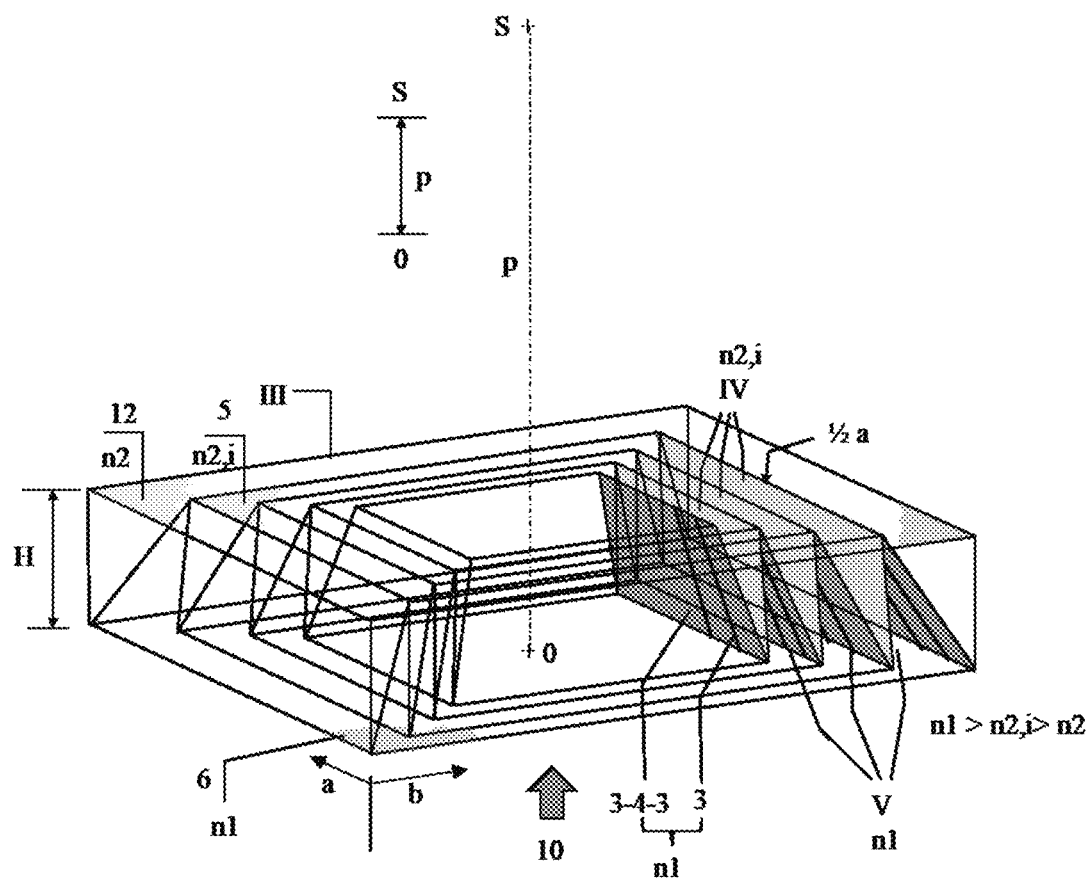
FIG. 30 Apparatus of converging simplified pyramidal flat lens.

The elements of the pyramidal plane (3 and 3-4-3) are shown in the interior (4in), i.e. at the side of light entry, FIG. 30. The volumes indicated by IV are filled with transparent material owing index of refraction (n2,i) whereas the volumes indicated by V are filled with transparent material owing index of refraction (n1); with the condition that n1>n2>n2,i. The first upper volume is filled with n2 up its surface (12), the second upper volume is filled with n2, 1 up to its surface, the third volume is filled with n2,3 up to its surface, . . . etc. till we reach n2,i–1 before the center zone (11). Following the critical condition for light ray refraction; the degree of refractive indexes is: n2<n2,1<n2,2<n2,3 . . . <n2, i–1. Thus, the surface indicated by 5 is the heterogeneous composition of the n2-group. The side of light entry (6) has only a single of index of refraction n1 since the volumes facing the light entry are filled with the same index of refraction.

III-2-2 Diverging Pyramidal Flat Lens

Figure 31:
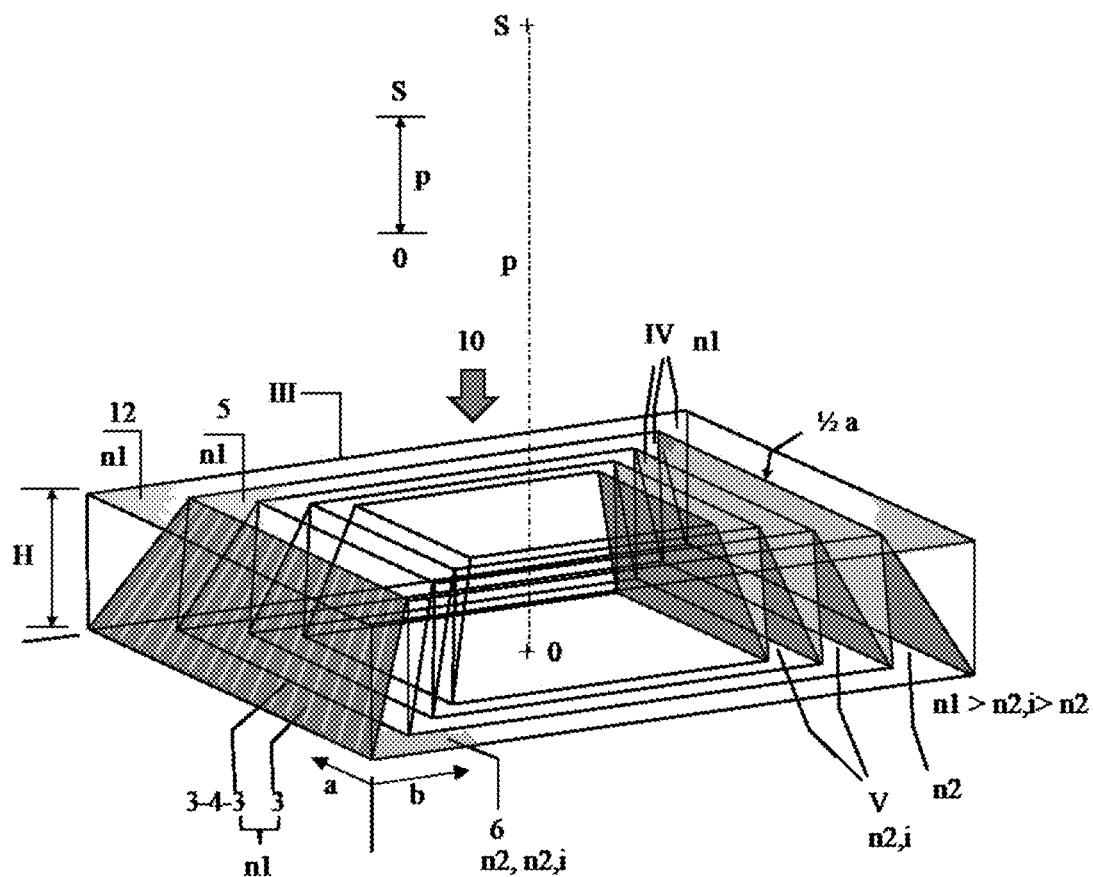
FIG. 31 Apparatus of diverging simplified pyramidal flat lens.

The elements of the pyramidal plane (3 and 3-4-3) are shown in the exterior (4out), i.e. at the side of light entry, FIG. 31. The volumes indicated by V are filled with transparent material owing index of refraction n2, n2,1, n2,3, . . . (n2,i–1) whereas the volumes indicated by IV are filled with transparent material owing index of refraction (n1); with the condition that n1>n2>n2,i. The first lower volume is filled with n2 up its surface (12), the second upper volume is filled with n2, 1 up to its surface, the third volume is filled with n2,3 up to its surface, . . . etc. till we reach n2,i–1 before the center zone (11). Following the critical condition for light ray refraction; the degree of refractive indexes is: n2<n2,1<n2,2<n2,3 . . . <n2, i–1. Thus, the surface indicated by 6 is the heterogeneous composition of the n2-group. The side of light entry (5 and 12) has only a single of index of refraction n1 since the volumes facing the light entry are filled with the same index of refraction.

III-3 the Focal Length

III-3-1 Ideal Lens

Figure 32:
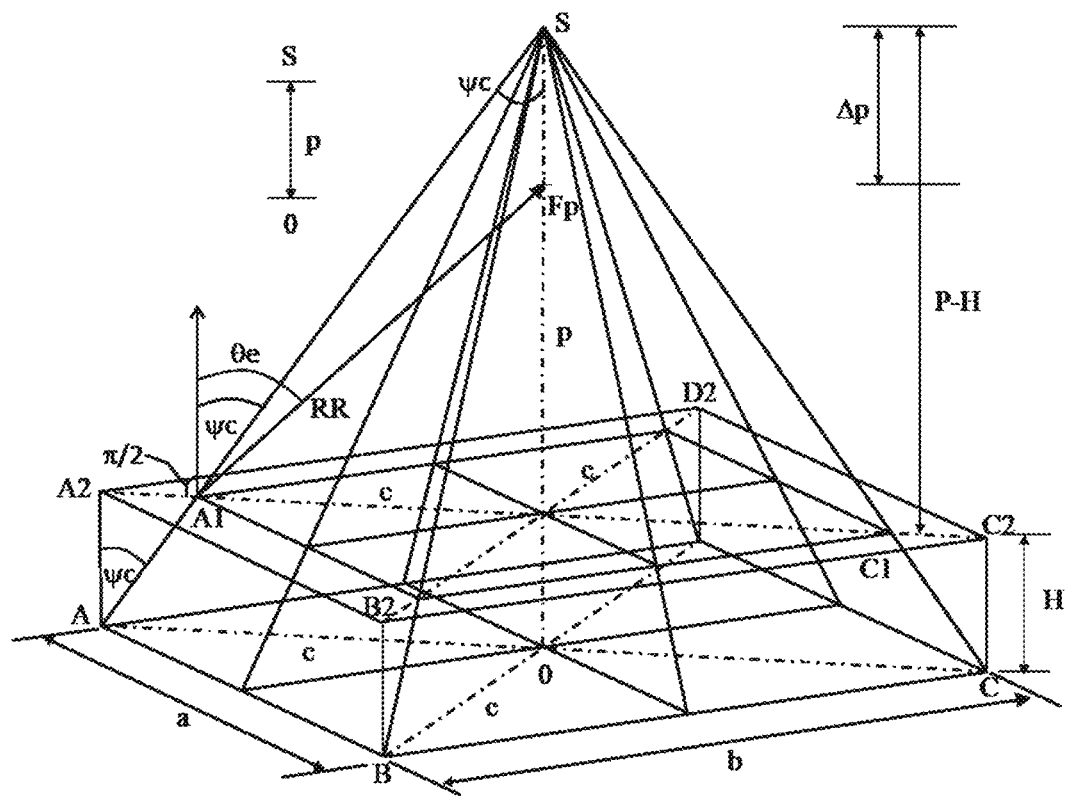
FIG. 32 Determination of the focal length of the ideal pyramidal flat lens at the diagonal c.

The following analysis is for a positive flat lens, light enters toward converging structure. The analysis for negative flat lens is also the same. The focal length FL is a function of the pyramid height P. According to FIG. 32, the focal length is determined from the surface of the flat lens to the focal point Fp, the focal length is equal to $$FL=(p-H)-\Delta p \qquad \text{III-2}$$

The focal length FL of the flat lens a light ray emerges from point A1 can be also found from the trigonometric relation at the diagonal $$\tan(\theta e)c = \frac{c/2 - A2A1}{FL} \qquad \text{III-3}$$

Where: θe is the exit angle of the refracted light ray RR and A2A1 is the distance between points A2 and A1, which can be found from the trigonometric relation $$\tan\psi c = \frac{A2A1}{H} = \frac{c/2}{p} \qquad \text{III-4}$$

Substitute equation III-4 into equation III-3 and eliminating the distance A2A1 from both equations, yields $$\tan\theta e = \frac{c/2(1-H/p)}{FL} \qquad \text{III-5}$$

Figure 33:
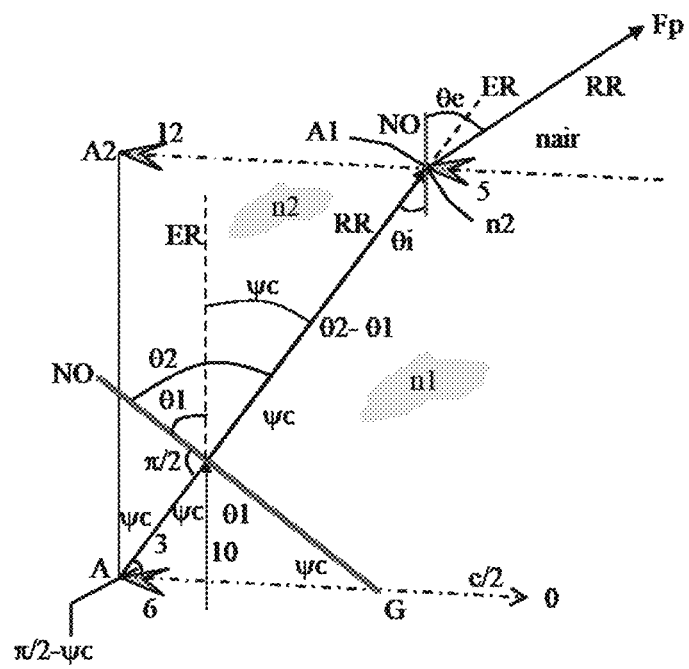
FIG. 33 Trajectory of light ray is shown at the corner of the ideal pyramidal flat lens.

The exit angle of the light ray θe can be found from the trigonometric diagram of FIG. 33. FIG. 33 is an expanded view of the triangle at the points A, A2, A1. First, we apply Snell's law from region n1 to region n2 (for n1>n2):

$$n1 \sin\theta 1 = n2 \sin\theta 2 \qquad \text{III-6}$$

The striking angle θ1 is equal to $$\theta 1 = \pi/2 - \psi c \qquad \text{III-7}$$

Then from equations III-5 and 6, we find the internal exit angle θ2

$$\theta 2 = \sin^{-1}\left(\frac{n1}{n2}\cos\psi c\right) \qquad \text{III-8}$$

The striking angle θ1 is always equal to $\pi/2-\psi c$. However, the first refracted angle θ2 is in the range: $\pi/2 \geq \theta 2 > \theta 1$. The range of θ2 can be correlated to the inclination angle $\psi c$: $\pi/2 \geq \theta 2 > \pi/2 - \psi c$. In order to enforce the refracted ray to pass tangent to object 3 at the interface between volume (n1) and volume (n2) is to make the argument of the right hand side of equation III-8 to be equal to 1.0, so θ2 is equal to $\pi/2$. Whatever is the inclination $\psi c$, the ratio of n1/n2 is adjusted to satisfy the previous condition. In practice, we may keep the argument of equation III-8 less than 1.0 and in this case, the refracted ray has to pass through volume (n2).

If the argument of the inverse sin of equation III-8 is less than 1.0 it implies that the incident angle θ1 is less than the critical angle, because θ2 has not reached 90° at this case. The total internal reflection occurs when θ1 exceeds the critical angle θcritical (=$\sin^{-1}$(n2/n1) at the condition that θ2=90°.

From the trigonometric (FIG. 33) the incident angle θi is $$\theta i = \theta 2 - \theta 1 \qquad \text{III-9}$$

The range of the incident angle θi is any value greater than zero to $\psi c$.

Substitute equations III-6 and 7 into equation III-9, yield $$\theta i = \sin^{-1}\left(\frac{n1}{n2}\cos\psi c\right) - \pi/2 + \psi c \qquad \text{III-10}$$

It must be noted that as we reach the center the inclination $\psi c$ approaches $\pi/2$ and θi approaches zero. The right hand side of equation III-10 is equal to zero when $$\sin^{-1}\left(\frac{n1}{n2}\cos\psi c\right) + \psi c = \pi/2 \qquad \text{III-11}$$

On the other hand, the right hand side of equation III-10 is equal to $\psi c$ when $$\sin^{-1}\left(\frac{n1}{n2}\cos\psi c\right) - \pi/2 = 0 \qquad \text{III-12}$$

If we consider the light ray emerges from the point at which the index of refraction equal to n2, then the light ray suffers only refraction from the surface of n2 to air. By applying Snell's law between the incident angle θi and the exit angle θe from the surface of flat at the ambient (denoted "na")

$$n2 \sin\theta i = na \sin\theta e \qquad \text{III-13}$$

Because light ray refracts at 90° from the normal, i.e. tangent to the interface between n1 and n2, then θi is equal to $\psi c$. The exit angle of refractive ray θe is, at the diagonal c, $$(\theta e)c = \sin^{-1}\left(\frac{n2}{na}\sin\psi c\right) \qquad \text{III-14}$$

The subscript c is for the diagonal c. We note that as we reach the center $\psi c$ approaches zero and the exit angle θe approaches zero as well. All light rays emerge from the surface at any point of the pyramidal planes will meet at the focal point Fp. From the condition of critical angle (the refracted ray is tangent to the refracting object (3) before emerging to air) at the diagonal axis c;

$$n2 = n1 \cos\psi c \qquad \text{III-15}$$

Equation III-15 is the critical optical composition for a given vertical inclination. Then by eliminating n2 from equations III-14 and 15, we have $$(\theta e)c = \sin^{-1}\left[\frac{n1}{na}\sin\psi c \cos\psi c\right] \qquad \text{III-16}$$

$$(\theta e)c = \sin^{-1}\left[\frac{n1}{2na}\sin 2\psi c\right] \qquad \text{III-17}$$

The maximum exit angle occurs for when the argument of the right hand side is unity, this means the focal point is at the surface of the lens. According to equation III-17, the argument of the inverse sin must be less than 1 in order to have a focal point above the surface:

$$\frac{n1}{2na}\sin 2\psi c < 1 \qquad \text{III-18}$$

Substitute equation III-17 into equation III-3, we deduce the final relation of the focal length measured from the diagonal c:

$$FL = \frac{c/2(1-H/p)}{\tan\sin^{-1}\left[\frac{n1}{2na}\sin 2\psi c\right]} \qquad \text{III-19}$$

Figure 34:
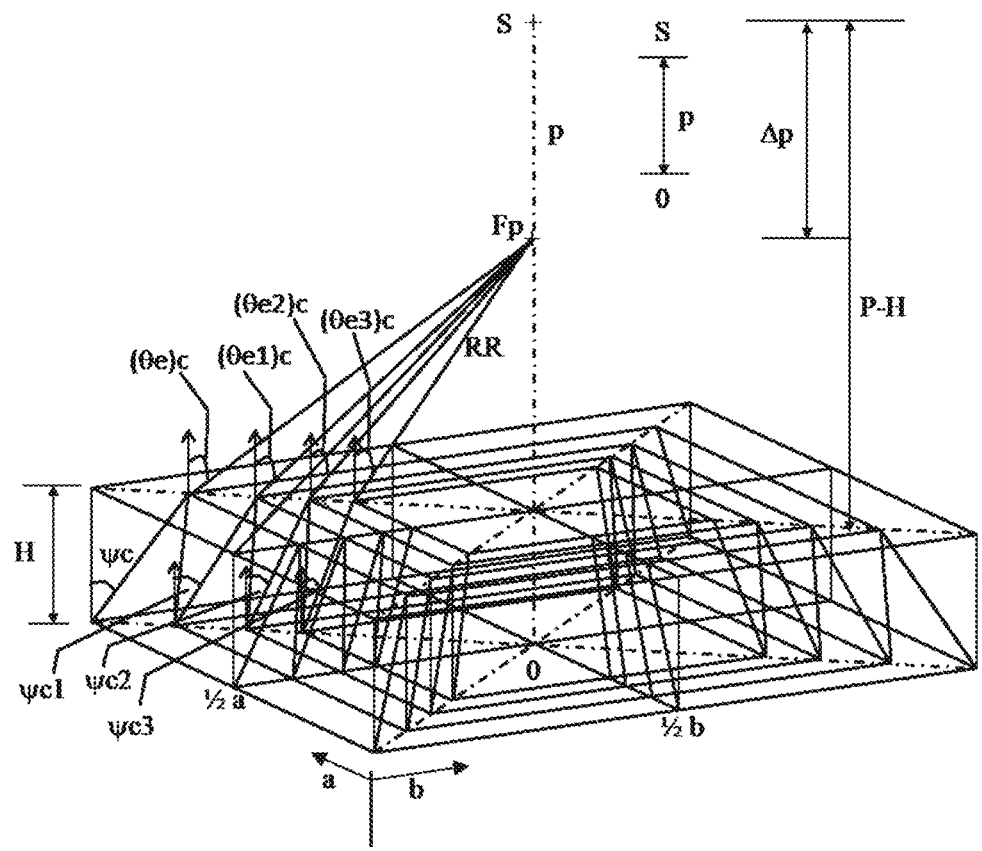
FIG. 34 The refracted rays from an ideal pyramidal flat lens are shown at the diagonal c.

The index of refraction from light entry, n1, is kept constant for all pyramidal planes, and because the index of refraction of the ambient medium na (assume air) is always constant then the only variable of equation III-7 is the inclination angle $\psi c$. At the border, $\psi c$ is the largest; hence, θe is greatest at the same point. As we approach the centerline $\psi s$ becomes smaller, and consequently the exit angle θe becomes smaller as shown in FIG. 34.

Figure 35:
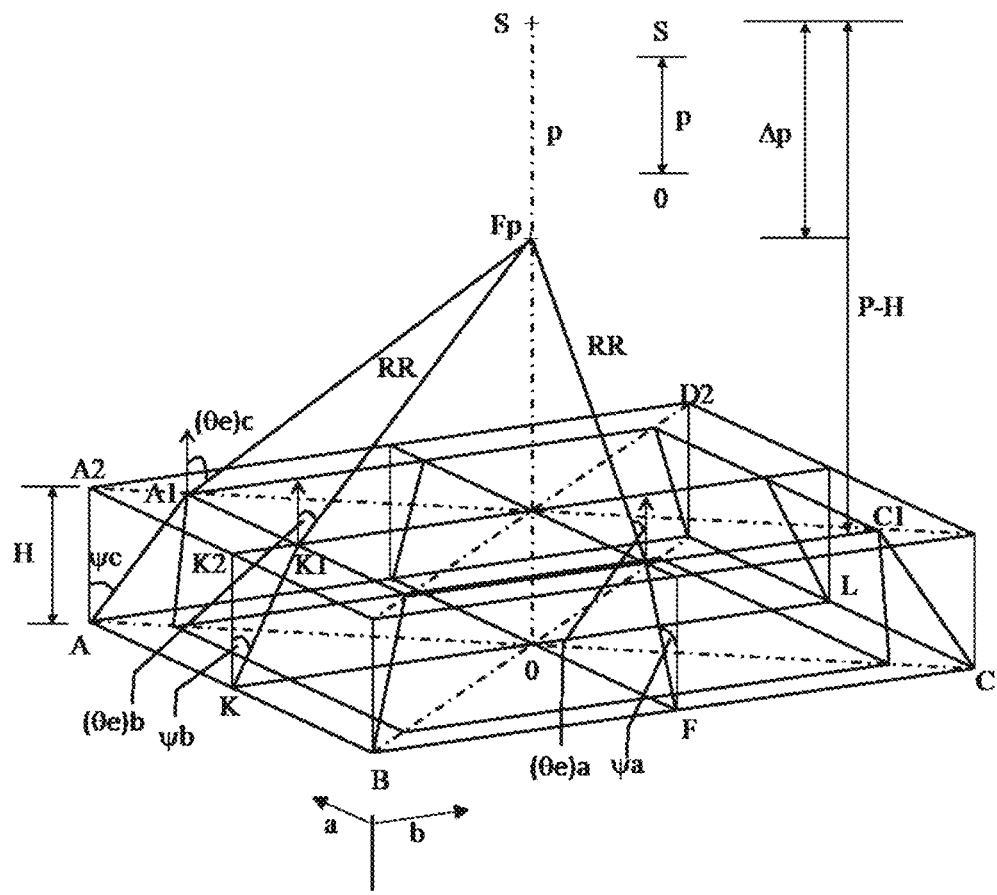
FIG. 35 The refracted rays from an ideal pyramidal flat lens are shown at the half sides and at the diagonal with the note that the focal length is constant but the exit angles are not.

Similarly, we can reach to equation III-14 for sides a and b (FIG. 35):

$$(\theta e)b = \sin^{-1}\left(\frac{n2}{na}\sin\psi b\right) \quad \text{III-20}$$

$$(\theta e)a = \sin^{-1}\left(\frac{n2}{na}\sin\psi a\right) \quad \text{III-21}$$

Knowing that; the largest vertical inclination for a rectangle base is at the diagonal c ($\psi$c), the smallest vertical inclination is at the longer side ($\psi$a) and the medial vertical inclination is at the shorter side ($\psi$b), that is $\psi c > \psi b > \psi a$. The exit angle can also be found in the similar manner;

$$(\theta e)b = \sin^{-1}\left[\frac{n1}{2na}\sin 2\psi b\right] \quad \text{III-22}$$

$$(\theta e)a = \sin^{-1}\left[\frac{n1}{2na}\sin 2\psi a\right] \quad \text{III-23}$$

It can be concluded that;

$$(\theta e)c > (\theta e)b > (\theta e)a \quad \text{III-24}$$

It can be shown that the exit angles as a function of the focal length at the a and b sides are $$\tan(\theta e)b = \frac{b/2(1 - H/p)}{FL} \quad \text{III-25}$$

$$\tan(\theta e)a = \frac{a/2(1 - H/p)}{FL} \quad \text{III-26}$$

And, the focal length measured at the a and b sides are $$FL = \frac{b/2(1 - H/p)}{\tan\sin^{-1}\left[\frac{n1}{2na}\sin 2\psi b\right]} \quad \text{III-27}$$

$$FL = \frac{a/2(1 - H/p)}{\tan\sin^{-1}\left[\frac{n1}{2na}\sin 2\psi a\right]} \quad \text{III-28}$$

The focal length is the same for all exit angles. The focal length depends on size of the flat lens (diagonal c), the thickness of the length H, the height of the pyramid p, the applied materials with refractive indexes n1, n2, and on the index of refraction of the ambient medium na (e.g. air). The ideal pyramidal flat lens is a complicated since it acquires a gradual change in the index of refraction from the boarder to the center at the interface for 360 refracting objects (3) for each pyramidal plane.

III-3-2 Simplified Pyramidal Flat Lens

A simplified ideal pyramidal flat lens can be reached if we apply for each pyramidal plane its least critical optical composition to avoid the case of total internal reflection. Knowing that the least critical optical composition is always along the diagonals c since the vertical inclination is the highest. By substituting equation III-15 into equations III-20 and 21, we deduce the algebraic relations of the exit angles at a and b sides:

$$(\theta e)b = \sin^{-1}\left(\frac{n1\cos\psi c}{na}\sin\psi b\right) \quad \text{III-29}$$

-continued $$(\theta e)a = \sin^{-1}\left(\frac{n1\cos\psi c}{na}\sin\psi a\right) \quad \text{III-30}$$

The exit angle at the diagonal c remains unchanged (equation III-16). If we take the ratio of the arguments of equation 29 and 30 and divide them by the arguments of the ideal lens (equations III-22 and 23) we found out they become lowered by a factor (cos arc/cos orb) for the a-side and by a factor of (cos $\psi$c/cos $\psi$a) for the b-side.

Figure 36:
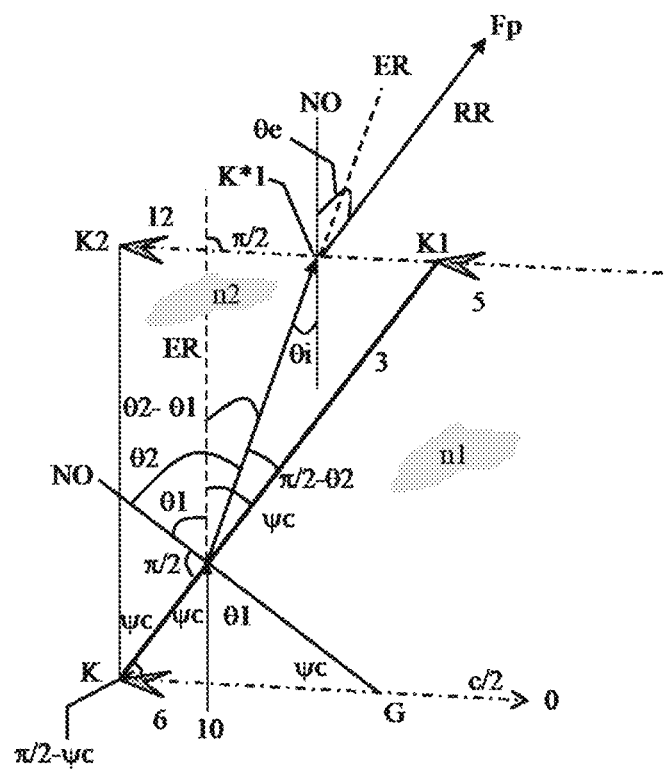
FIG. 36 Deviation of the light ray at the half side for simplified pyramidal flat lens.

Light rays strike the diagonal axes will refract tangent to the interface between two reversed volumes, otherwise rays will divert from the interface and crossing the reversed volume to the light entry, FIG. 36. In the ideal lens, 1 we have to have per axial base (180 axes from both sides) a critical composition for light refraction at the critical angle, tangent to the interface between n1 and n2. Here in the simplified lens, we have only a single critical composition evaluated at the diagonal c.

In order to find the new focal lengths measured at sides a and b for a simplified pyramidal flat lens we substitute equations III-29 and 30 into equations III-25 and 26:

$$FL = \frac{b/2(1 - H/p)}{\left[\tan\sin^{-1}\left(\frac{n1\cos\psi c}{na}\sin\psi b\right)\right]} \quad \text{III-31}$$

$$FL = \frac{a/2(1 - H/p)}{\left[\tan\sin^{-1}\left(\frac{n1\cos\psi c}{na}\sin\psi a\right)\right]} \quad \text{III-32}$$

The focal point becomes larger in the case of the rectangular base since the refracted rays emerged from axes other than the diagonals will diverted above the ideal position of the focal point, depending on the dimension of the rectangular base.

The algebraic relations of the focal lengths for the simplified pyramidal flat lens for a rectangular base are given by equations III-19, 31 and 32.

The algebraic relations of the focal lengths for a square base, for the simplified pyramidal flat lens are given by equations III-19 and 31.

The algebraic relation of the focal length for a circular base, for the simplified pyramidal flat lens is given by equations III-19 but we replace c/2 by the radius r of the base circle.

Figure 37:
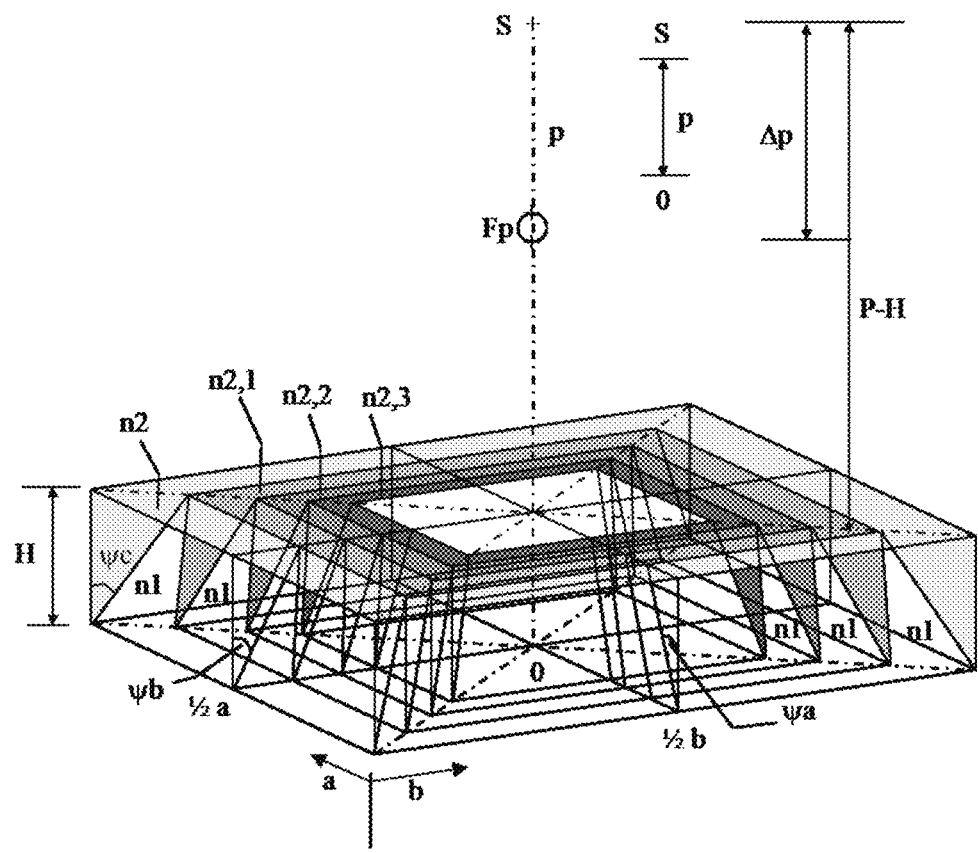
FIG. 37 Adaptization of the simplified pyramidal flat lens.

In the simplified pyramidal flat lens, we fill the volume of anvil away from light with n2-group refractive indices while the volume of the anvil facing the light entry is always filled with index of refraction n1. Each 3-D anvil (away from light entry) is filled with single index of refraction evaluated at the least critical optical composition for each plane. The simplified pyramidal flat lens for rectangular is shown in FIG. 37. The outer volume is filled with n2 (=n1 cos $\psi$c), the first inferior volume is filled with n2,1 (=n1 cos $\psi$c1), the third inferior volume is filled n2,3 (=n1 cos $\psi$c2), and so on. The least index of refraction n2 is at the border while the greatest index of refraction n2,i−1 is near to the center line.

It can be concluded that the size of the focal point for the simplified pyramidal flat lens is greater for rectangular base than for square base, for the same vertical inclinations and optical compositions. If the pyramidal flat lens is made with circular base, the focal point is the smallest than all previous geometries, it is equivalent to the ideal pyramidal flat lens since the vertical inclinations at the axes at each plane is constant.

What is claimed is:

1. An apparatus for converging and diverging light rays using a flat transparent structure from both surfaces comprises: An outer transparent 3-D vertical anvil (with larger area at one surface and with sharp area in the opposite surface); A first transparent inclined 3-D anvil; A second transparent inclined 3-D anvil in the reverse orientation; Further, the first and second transparent inclined 3-D anvils are in sequential placements from the border of the flat transparent structure to the center of the flat transparent structure; Further, each of the transparent inclined anvils comprising: A first 3-D inclined transparent plane that, if extended, converges to a summit point of finite pyramid height; A second 3-D inclined transparent plane that, if extended, converges to a summit point of infinite pyramid height except the most inferior transparent plane which converges if extended to the summit point of the finite pyramid height; Further, the first inclined 3-D transparent plane with the finite pyramid height comprising 360 transparent rectangular distinct objects located at the interior of the transparent plane; Further, the extensions of the transparent rectangular objects meet at the summit of the finite pyramid height; Further, the structure of the transparent 3-D inclined anvils resembles a shape of nozzle rectangular or circular without the addition of the outer transparent 3-D vertical anvil.

2. An apparatus for converging and diverging light rays using a with larger area at one surface and with sharp area in the opposite surface); A first transparent inclined 3-D anvil; A second transparent inclined 3-D anvil in the reverse orientation; Further, the first and second transparent inclined 3-D anvils are in sequential placements from the border of the structure to the center of the structure; Further, each transparent inclined anvil comprising: A first 3-D inclined transparent plane that, if extended, converges to a summit point of finite pyramid height; A second 3-D inclined transparent plane that, if extended, converges to a summit point of infinite pyramid height except the most inferior transparent plane which converges if extended to the summit point of the finite pyramid height; Further, the first inclined 3-D transparent plane with the finite pyramid height comprising 360 transparent rectangular distinct objects located at the exterior of the transparent plane; Further, the extensions of the transparent rectangular objects meet at the summit of the finite pyramid height; Further, the structure of the transparent 3-D inclined anvils resembles a shape of nozzle rectangular or circular without the addition of the outer transparent 3-D vertical anvil.

3. The apparatus of claim 1, wherein the volume of the 3-D anvils comprising the interior rectangular objects are filled with medium of refractive Index same as the index of refraction of the rectangular objects but with different densities; Further, the outer vertical anvil and the reversed 3-D anvils with respect to the anvils comprising the rectangular objects are filled with several refractive index materials lower than the index of refraction of the rectangular objects; Further, the degree of index of refraction in the outer and reversed 3-D anvils is gradually increasing from the boundary reaching the same index of refraction of the rectangular objects near the center.

4. The apparatus of claim 2, wherein the volume of the 3-D anvils comprising the exterior rectangular objects are filled with medium of refractive index same as the index of refraction of the rectangular objects but with different densities; Further, the outer vertical anvil is filled with the same index of refraction of the filling volumes comprising the rectangular objects; Further, the reversed 3-D anvils with respect to the anvils comprising the rectangular objects are filled with several refractive index materials lower than the index of refraction of the rectangular objects; Further, the degree of index of refraction in the reversed 3-D anvils is gradually increasing from the boundary reaching the same index of refraction of the 3-D rectangular objects near the center.

5. The apparatus of claim 3, wherein the light entry from the site farther away from the pyramid summit point is for positive lens.

6. The apparatus of claim 4, wherein the light entry from the site of the pyramid summit point is for negative lens.

7. An apparatus for converging and diverging light rays using a flat transparent structure from both surfaces comprises: An outer transparent 3-D vertical anvil (with larger area at one surface and with sharp area in the opposite surface); A first transparent inclined 3-D anvil; A second transparent inclined 3-D anvil in the reverse orientation; Further, the first and second transparent inclined 3-D anvils are in sequential placements from the border of the structure to the center of the structure; Further, each transparent inclined anvil comprising: A first 3-D inclined transparent plane that if extended it converges to a summit point of finite pyramid height; A second 3-D inclined transparent plane that if extended it converges to a summit point of infinite pyramid height except the most inferior transparent plane which converges if extended to the summit point of the finite pyramid height; Further, the first inclined 3-D transparent plane with the finite pyramid height comprising 360 transparent rectangular distinct objects located at the interior and exterior of the transparent plane; Further, the extensions of the transparent rectangular objects meet at the summit of the finite pyramid height; Further, the structure of the transparent 3-D inclined anvils resembles a shape of nozzle rectangular or circular without the addition of the outer transparent 3-D vertical anvil.

8. The apparatus of claim 7, wherein the light entry from the site farther away from the pyramid summit point is for positive lens.

9. The apparatus of claim 7, wherein the light entry from the site nearer to the pyramid summit point is for negative lens.

* * * * *